United States Patent
Pandey et al.

(10) Patent No.: US 12,112,297 B1
(45) Date of Patent: Oct. 8, 2024

(54) METHOD AND SYSTEM FOR INTEGRATED ANALYSIS OF DATA FROM MULTIPLE SOURCE ENVIRONMENTS

(71) Applicant: DevRev, Inc., Palo Alto, CA (US)

(72) Inventors: Dheeraj Pandey, San Jose, CA (US);
Manoj Agarwal, Palo Alto, CA (US);
Brent Chun, Rancho Palos Verdes, CA (US);
Bhavana Thudi, Fremont, CA (US);
Ken Chen, San Francisco, CA (US);
Nimar Arora, Union City, CA (US);
Brian Byrne, Issaquah, WA (US);
Steven Poitras, Los Gatos, CA (US);
Anindya Misra, Arlington, VA (US);
Jan Olderdissen, Herrenberg (DE)

(73) Assignee: DevRev, Inc, Palo Alto, CA (US)

( * ) Notice: Subject to any disclaimer, the term of this patent is extended or adjusted under 35 U.S.C. 154(b) by 105 days.

(21) Appl. No.: 17/670,359

(22) Filed: Feb. 11, 2022

Related U.S. Application Data

(60) Provisional application No. 63/148,987, filed on Feb. 12, 2021.

(51) Int. Cl.
   *G06Q 10/101* (2023.01)
   *G06Q 10/0631* (2023.01)
   *G06Q 10/0639* (2023.01)

(52) U.S. Cl.
   CPC ....... *G06Q 10/101* (2013.01); *G06Q 10/0631* (2013.01); *G06Q 10/0639* (2013.01)

(58) Field of Classification Search
   None
   See application file for complete search history.

(56) References Cited

U.S. PATENT DOCUMENTS

| | | | | |
|---|---|---|---|---|
| 2005/0187737 | A1* | 8/2005 | Toyoshima | G06Q 10/06 702/182 |
| 2007/0150480 | A1* | 6/2007 | Hwang | G06Q 50/60 |
| 2018/0032601 | A1* | 2/2018 | Venkataraman | G06F 16/285 |
| 2020/0374696 | A1* | 11/2020 | Zhou | H04W 12/069 |
| 2021/0200760 | A1* | 7/2021 | Bui | G06F 16/2474 |
| 2021/0342738 | A1* | 11/2021 | Sarferaz | G06Q 10/10 |

OTHER PUBLICATIONS

Atlassian, "Configure workflow triggers", Atlassian Support, Jira Cloud Administration, Date found via Internet Archive as Nov. 2020.

(Continued)

*Primary Examiner* — Matthew T Sittner
(74) *Attorney, Agent, or Firm* — Vista IP Law Group, LLP

(57) ABSTRACT

Disclosed is an improved approach to process data and events from disparate ecosystems pertaining to products. An approach is provided to automatically cluster events from various ecosystems into noteworthy incidents and to correlate them with entities extracted from each system. Incidents are correlated between ecosystems to classify the type of incidents and to give a coherent converged picture of the event streams coming from the various ecosystems. Noteworthy incidents are automatically converted into tickets and their severity is ascertained from the associated incidents. Tickets that reference underlying defects with the product or service are converted into issues.

18 Claims, 14 Drawing Sheets

(56) References Cited

OTHER PUBLICATIONS

Atlassian, "What are the issue statuses, priorities, and resolutions", Atlassian Support, Jira Cloud Administration, Date found via Internet Archive as Jul. 2019.
Atlassian, "Work with issue workflows," Atlassian Support, Jira Cloud Administration, Date found via Internet Archive as Oct. 2020.
Atlassian, "Configure advanced issue workflows", Atlassian Support, Jira Cloud Administration, Date found via Internet Archive as Nov. 2020.
Salesforce, "Primitive Data Types", Overview of Salesforce Objects and Fields, Object Reference for the Salesforce Platform, Date found via Internet Archive as Sep. 2015.
Salesforce, "Apex Transactions", Apex Developer Guide, Running Apex, Apex Transaction, and Governor Limits, Date found via Internet Archive as Sep. 2015.
Salesforce, "Getting Started with Streaming API", Streaming API Developer Guide, Date found via Internet Archive as May 2015.
Salesforce, "Create a User Role", Salesforce Security Guide, Give Users Access to Data, Date found via Internet Archive as Oct. 2015.
Pillowdrool, "Increasing cost of Zendek", Reddit, URL: https://www.reddit.com/r/Zendesk/comments/j3bi6f/increasing_cost_of_zendek/, Dated 2021.
TNTGav, "In-depth review of Zendesk and its potential usage at an MSP", Reddit, URL: https://www.reddit.com/r/msp/comments/40mmn8/indepth_review_of_zendesk_and_its_potential_usage/, Dated 2016.
Jain, Sandeep, "B2B Support Tools Are Still Stuck in The Dark Ages. Here's a possible way out", Medium.com, Dated Feb. 7, 2019.
Svane, Mikkel, et al., "Shareholder Letter", Zendesk Quarter 3 2020, URL: https://s2.q4cdn.com/278771905/files/doc_financials/2020/q3/Zendesk-Q3-2020-Shareholder-Letter.pdf, Dated Oct. 29, 2020.
Whitepaper, "2021 Gartner Magic Quadrant for the CRM Customer Engagement Center", Zendesk Blog, Date found via Internet Archive as Jun. 2021.
Nadeau, Charles, "Zendesk Support scalability and performance: Technical architecture", Zendesk setting and billing, Date found via Internet Archive as Oct. 2021.
Zendesk, "Develop on the Zendesk Sunshine Platform" Zendesk Developers, Zendesk Documentation, Date found via Internet Archive as Aug. 2013.
Anton De Young, "Understanding Zendesk Support user roles", Zendesk User Management, Date found via Internet Archive as Nov. 2021.
Anton De Young, "Creating custom roles and assigning agents", Zendesk User Management, Date found via Internet Archive as Nov. 2021.
Zendesk Team, "Understanding default roles in Zendesk Chat", Zendesk Documentation Team, Zendesk Help, Using Chat for live chat, Date found via Internet Archive as Jan. 2022.
Stack, Rob, "Giving users access to Explore", Zendesk Documentation Team, Zendesk Help, Using Explore for reporting and analytics, Date found via Internet Archive as Mar. 5, 2021.
Stack, Rob, "Giving agents access to Talk", Zendesk Documentation Team, Zendesk Help, Using talk for voice, Date found via Internet Archive as Feb. 2022.
Atlassian, supported platforms, Atlassian Support, Administering Jira application support, Installing Jira Applications, Date found via Internet Archive as Apr. 2019.
Atlassian, "Rest APIs", Jira Server, URL: https://developer.atlassian.com/server/jira/platform/rest-apis/, Date found via Internet Archive as Oct. 2018.
Atlassian, "Security Overview", Jira Server. URL :https://developer.atlassian.com/server/jira/platform/security-overview/, Date found via Internet Archive as Oct. 2019.
Atlassian, "Atlassian's approach to resilience", Trust Center, Security @ Atalassian, URL: https://www.atlassian.com/trust/security/data-management, Date found via Internet Archive as Apr. 17, 2021.
Atlassian, "A layered approach to data protection", Comprehensive data protection, URL: https://www.atlassian.com/trust/data-protection#compliance, Date found via Internet Archive as Mar. 3, 2021.
Atlassian, "Migrate from other issue trackers", Atlassian Support, Jira cloud administration, URL: https://support.atlassian.com/jira-cloud-administration/docs/migrate-from-other-issue-trackers/, Date found via Internet Archive as Oct. 2020.
Atlassian, "Performance and scale testing", Administering Jira applications Support, Data Center and Server 9.13, URL: https://confluence.atlassian.com/adminjiraserver/performance-and-scale-testing-965568707.html, Date found via Internet Archive as Dec. 2019.

* cited by examiner

METHOD AND SYSTEM FOR INTEGRATED ANALYSIS OF DATA FROM MULTIPLE SOURCE ENVIRONMENTS

CROSS-REFERENCE TO RELATED APPLICATIONS

The present application claims the benefit of priority to U.S. Provisional Application. No. 63/148,987, filed on Feb. 12, 2021, which is hereby incorporated by reference in its entirety.

BACKGROUND

The typical product or service in the modern economy touches upon, inhabits, or interrelates with numerous disparate locations, devices, and/or entities that pertain to the product or service. Each of these different locations, devices, and entities may inhabit its own compartmentalized ecosystem that is distinct from—and effectively walled off from— any of the other compartmentalized ecosystems.

For example, a company that develops a software product may correspond to a development environment having a set of development tools and databases that are organized and optimized for the software development process. The user of the software product may correspond to a set of computing devices, machines, or servers devices upon which the software program is executing or performing work. The administrators of the software product or the systems upon which the software is located may have their own set of operational or monitoring tools that are used to administer the software of underlying systems.

Similarly, a company or organization providing services instead of products will have some equivalent configurations or processes focused on the delivery of services as compared to a product. These capabilities may correspond to locations of service delivery, scope of services delivered, etc. In certain cases the service consumers may be either internal to the company or provided externally. Throughout this document the term product and service and software or service company can be used interchangeably.

One or more organizations within a company may be tasked to handle customer sales or user relationships using a set of systems or tools to manage the interactions with the customers/users (e.g., using CRM systems, billing systems, etc.).

Each of these ecosystems produce a stream of events that describe some activity or change in those systems. These events are unique to each ecosystem but they may reference some entities that span systems. It is important to note that the software product or service hierarchy is common across all ecosystems and the various event streams reference this common hierarchy either directly or indirectly.

Since these ecosystems are typically isolated from one another, this means that it is normally not possible to adequately or effectively perform analysis in a meaningful way regarding events or data that crosses the boundaries of these isolated ecosystems.

Moreover, the data that may be collected from these disparate sources would likely correlate to an extremely high volume of data. This means that any software or service organization that seeks to analyze data from across these disparate ecosystems would be inundated with a high volume of events coming from the many diverse sources.

Conventional approaches taken by software or service organizations face immense struggles to effectively extract value from these events and to respond to them efficiently. For example, one conventional approach is to use a manual process to analyze the data, where a significantly high-level of human effort is required to be devoted to individually analyzing these events and to act on them appropriately. This human-based approach is both costly and reactive rather than proactive, and tends to suffer from the inabilities of humans to be able to accurately and efficiently process huge amounts of data.

What this means is that the conventional analysis results tend to be incomplete, inaccurate, or just plain wrong in many cases. For instance, events such as test failures, customer login problems, service timeouts in data centers etc. can be captured from disparate systems and could have common root cause, where that root cause would possibly remain undetected if the human-based manual analysis approach is taken to analyze the data.

Therefore, there is a need for an improved approach to process data and events from disparate ecosystems pertaining to software products or services.

SUMMARY

Some embodiments provide an improved method, system, and computer program product to process data and events from disparate ecosystems pertaining to products or services. According to some embodiments, an approach is provided to automatically cluster events from various ecosystems into noteworthy incidents and to correlate them with entities extracted from each system. Incidents are correlated between ecosystems to classify the type of incidents and to give a coherent converged picture of the event streams coming from the various ecosystems. Noteworthy incidents are automatically converted into tickets and their severity is ascertained from the associated incidents. Tickets that reference underlying defects with the product or service are converted into issues. The issues are assigned to specific developer or service owner entities who are responsible for causing them or fixing them. In addition, the priority of the issues is determined by the scope of the associated tickets.

Other and additional objects, features, and advantages of the invention are described in the detailed description, figures, and claims.

BRIEF DESCRIPTION OF THE DRAWINGS

The drawings illustrate the design and utility of various embodiments of the invention. It should be noted that the figures are not drawn to scale and that elements of similar structures or functions are represented by reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

While certain embodiments described below may pertain to products or services specifically directed to software, it is noted that the invention is not limited in its applicability to just software, and is indeed applicable to any type of product or service.

Embodiments of the invention provide an improved method, system, and computer program product to process and integrate data and events from disparate ecosystems pertaining to products or services. These embodiments address a significant problem of conventional development and customer relations management (CRM) systems, which is that developers, producers or providers ("Dev") are greatly isolated from their users/customers ("Rev"). By removing barriers between the "Dev" side and the "Rev" side, this permits embodiments of the invention to easily connect code or other product development components on the Dev side to production issues and user/customer interactions on the Rev side. This permits the software development side to no longer have to work across silos of different systems to meaningfully communicate and collaborate with their software users and customers. One way in which this is accomplished in some embodiments is to provide functionality and/or structures so that some or all of the data/entities/items are related back to a product hierarchy component ("part").

Figure 1:
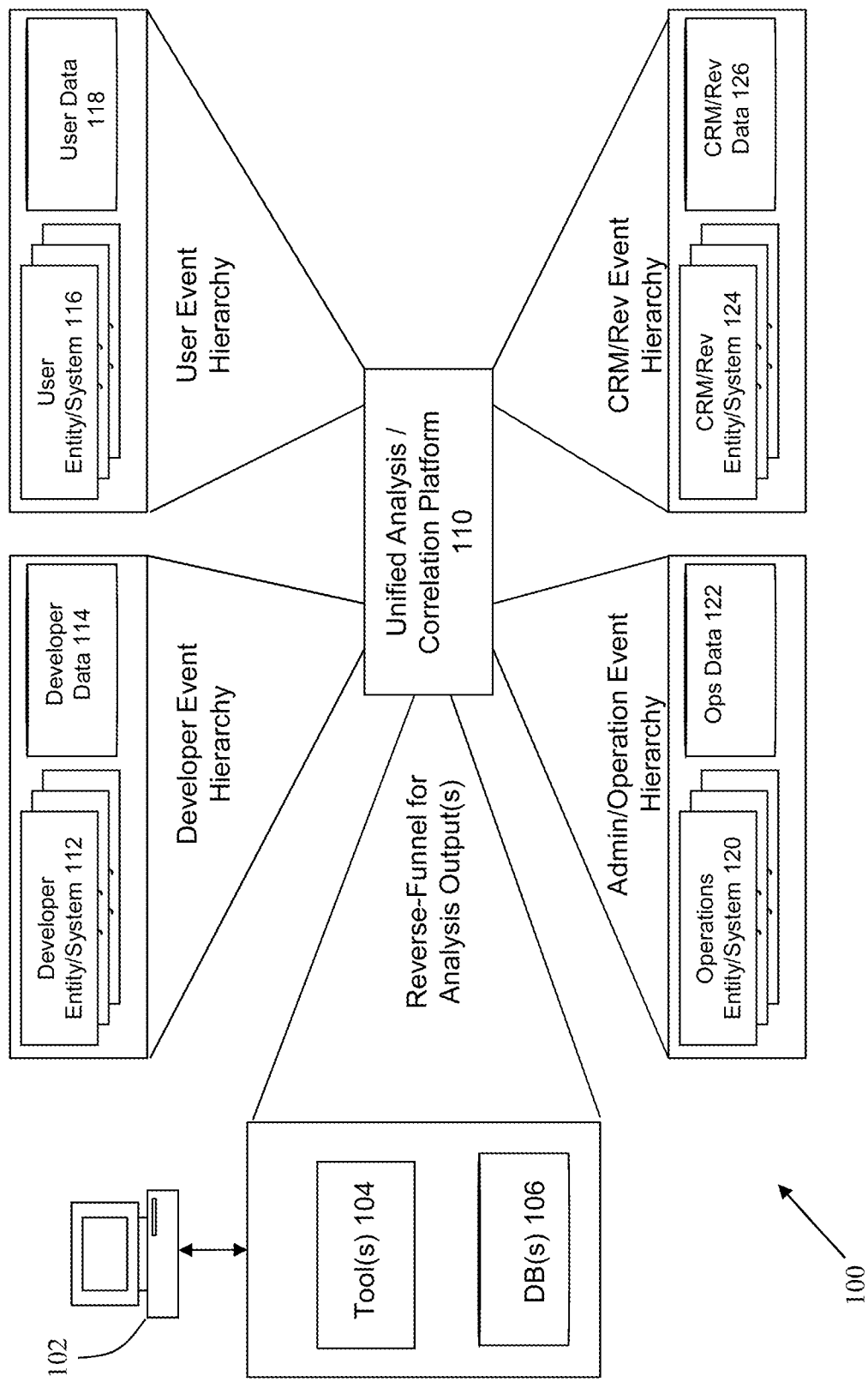
FIG. 1 provides an illustration of a system to implement some embodiments of the invention.

FIG. 1 provides an illustration of a system 100 to implement some embodiments of the invention. The system 100 provides a unified platform 110 to implement an automated template for autonomous clustering of events into event hierarchies as well as autonomous classification and communication between these hierarchies. The term "event hierarchy" may also be referred to herein as a "funnel", since the operation of the system involves the funneling of large amounts of event data from the different hierarchies for processing by the unified platform. The term "unified" refers to the fact that multiple such event hierarchies, rather than being isolated from one another, is instead processed together within a common platform.

Any number or type of event hierarchies may be acted upon by embodiments of the invention. For example, the figure illustrates event hierarchies pertaining to developer entities/systems 112, user entities/systems 116, CRM/Revenue-based entities/systems 124, and admin/operator entities/systems 120. The developer entities/systems 112 may correspond to developer data 114, the user entities/systems 116 may correspond to user data 118, the CRM/Revenue-based entities/systems 124 may correspond to CRM/Rev data 126, and the admin/operator entities/systems 120 may correspond to Ops ("operations") data 122.

In some embodiments, the unified platform 110 uses machine-learning based techniques to automatically process the data and events from the multiple event hierarchies, and to generate one or more databases ("DB") 106 comprising both raw data and properly categorized data so that analysis tools 104 can be used to extract useful information and accurate results. In this way, a correlated view of the data can be obtained, despite the fact that the event data may originate from numerous disparate and separated systems, and despite the fact that the collected event data may correspond to an immense amount of information that is collected.

This approach therefore allows software and service organizations to focus their efforts on the most important issues in their product and to anticipate and resolve customer problems before they are reported. The invention is applicable to any organization that develops products that are delivered to end customers in a manner such that events are collected during the development, deployment and usage of the product to monitor the health of the product's ecosystem. This invention outlines an application of the inventive method for the Software-as-a-Service (SaaS) technologies, but it is not limited to this category of technology and/or industry.

The system 100 may include one or more user stations 102 to operate the unified platform 110. The user stations and/or the servers that host or operate with the system comprises any type of computing device that may be used to implement, operate, or interface with the system. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system, such as a mouse or keyboard to manipulate a pointing object in a graphical user interface to generate user inputs. The database system may be communicatively coupled to a storage apparatus (e.g., a storage subsystem or appliance) over a network. The storage apparatus comprises any storage device that may be employed by the database system to hold storage content.

Embodiments of the invention operate by progressing objects within the system through a series of stages that will "funnel" the data into more meaningful sets of analyzed data as the object progress through the different stages. The raw data from the various Dev and Rev sources are likely to correspond to an extremely large volume of data, which individually by themselves may not provide enough cross-hierarchy context to be meaningful. That large volume of raw data, when analyzed in a unified way across the different hierarchies, may be used to form increasingly smaller and more meaningful sets of data that can be usefully provided to developers, users, managers, and/or any other party that can benefit from a unified cross-hierarchy look at events and data within the system.

Figure 2:
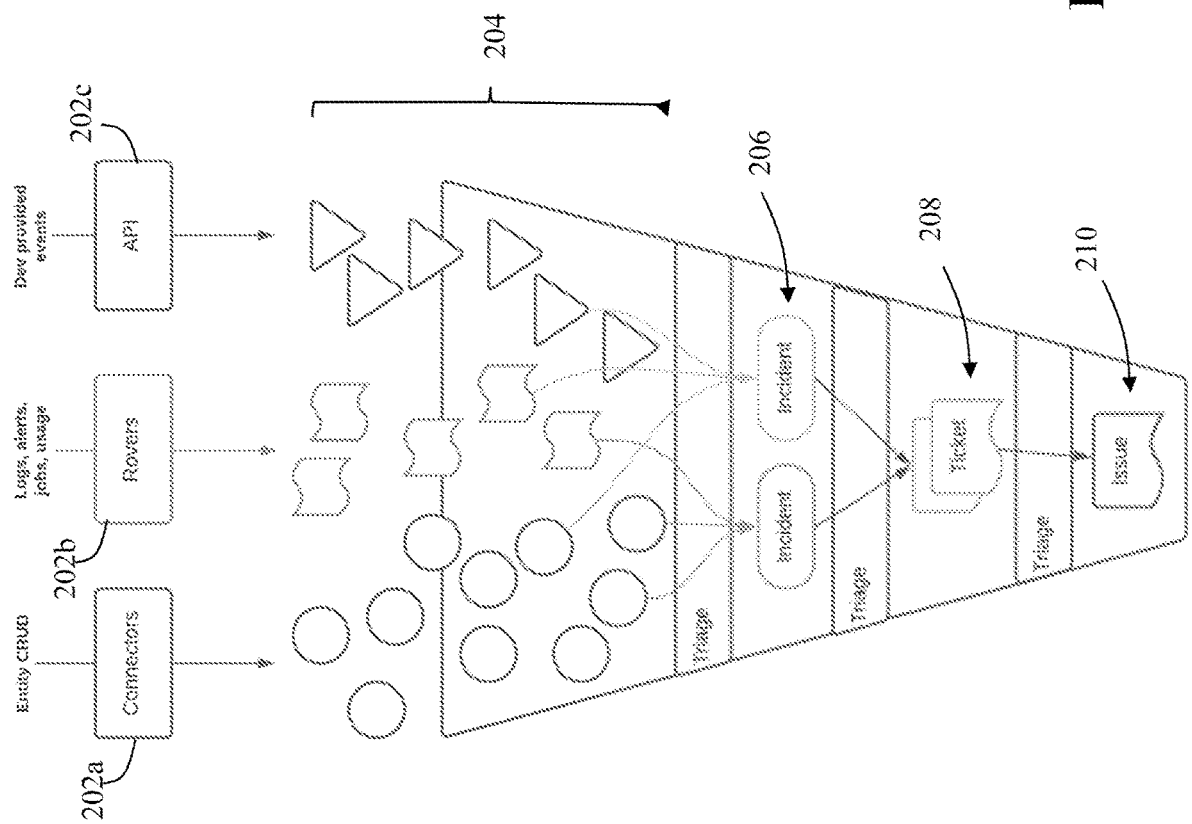
FIG. 2 illustrates the concept of an event funnel, sources, and stages as an object may progress through the system.

FIG. 2 illustrates the concept of an event funnel, sources, and stages as an object may progress through the system. Within this diagram, events 204 are generated or consumed from multiple event sources. These sources can be acquired using any suitable mechanisms or technique. For example, the events may be acquired using connectors 202a, rovers 202b, and/or using the unified platform's application programming interface ("API") 202c.

The connectors 202a provide bi-directional communications to an entity that provides data. For example, the connectors 202a may be used with respect to entity CRUD operations ("create, read, update, delete" operations). The rovers 202b may be used to implement collections activities in a single direction from the Dev or Rev entities, e.g., to collect logs, alerts, jobs, and usage data from an entity. The API 202c may be used to implement programmatic access to event data, e.g., for Dev provided events.

These events 204 then progress through the event funnel where a series of models are applied to cluster and classify the events into items of interest. For example, at a first funneling stage, events of interest (e.g., which are correlated from across multiple event hierachies) may be clustered into incidents 206. In a subsequent funneling stage, incidents that require human or machine interactions may lead to creation of a ticket 208. Any tickets that are deemed actionable enough may be used to create an issue 210. For example, an issue may be created if a production and/or service change is deemed necessary based upon a ticket.

Figure 3:
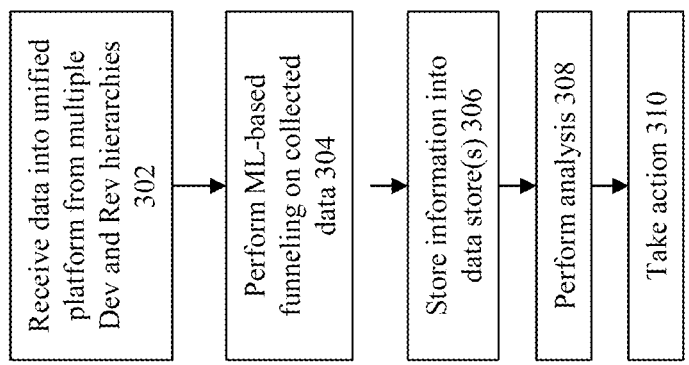
FIG. 3 shows a high-level flowchart for processing actions that are implemented according to some embodiments of the invention.

FIG. 3 shows a high-level flowchart for processing actions that are implemented according to some embodiments of the invention. At 302, data is received into the unified platform from a plurality of Rev and Dev hierarchies. As previously noted, any suitable collection mechanism may be used to obtain the data from the different event hierarchies, such as for example, collectors, rovers, and through an API.

At 304, processing is performed upon collected data. In particular, clustering and classification operations are implemented using the collected event data from across the multiple hierarchies. These clustering and classification operations are used to implement the funneling process to convert a large set/stream of event data into incrementally smaller sets of incident, ticket, and issue data. Notification/communication operations may also be implemented based upon the ML-based processing.

At 306, the output of the clustering, classification, and/or funneling operations are stored into one or more data storage locations and/or formats. For example, as described in more detail below, the analyzed data may be stored in a search/index store, a bulk store, an object database, and/or an analytics database.

At 308, analysis may be performed using the collected data. For example, incidents, tickets, and issues that were identified in the preceding steps may be used to analyze and identify the root cause of a customer problem when operating a software problem. At 310, one or more actions may be taken as a result of performing the analysis upon the data. For example, a developer may implement a correction and/or patch to the software to resolve the identified customer error with the software. Given the accumulation of data from rovers and connectors the system will receive a lot of great detail about what tools, programming languages, metrics and other various insights about the organizations and/or users which may be used to provide insight to other users of the system.

Figure 4:
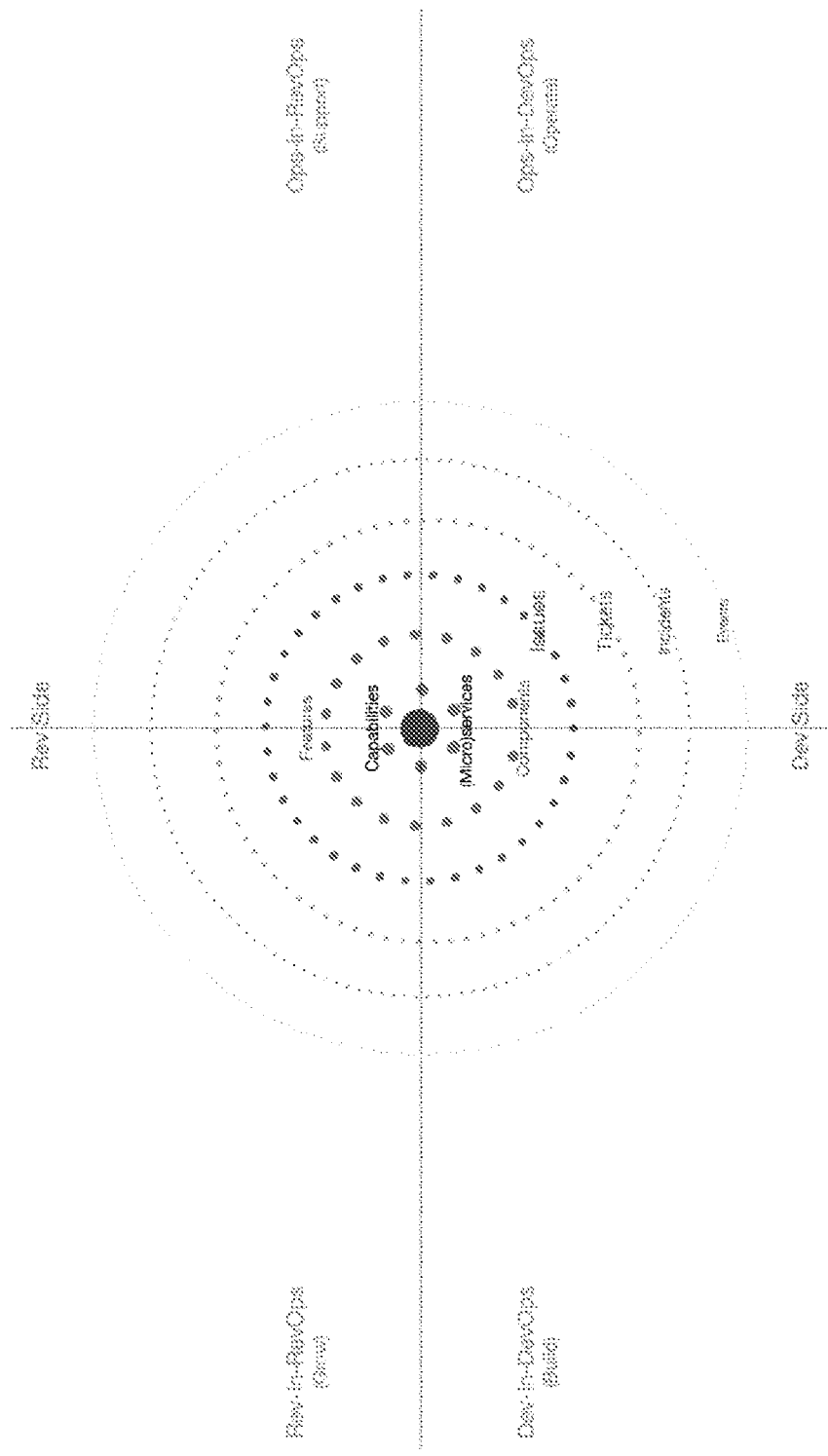
FIG. 4 provides a high-level illustration of four interrelated event hierarchies and relation to parts

As is evident, central to various embodiments of the invention is the idea of event hierarchies and product hierarchies. FIG. 4 provides a high-level illustration of four interrelated event hierarchies. While four specific event hierarchies are shown in the current embodiment figures, it is noted that other and additional event hierarchies may be implemented for additional embodiments. Therefore, the scope of the invention is not to be limited just to the specific event hierarchies illustrated in the figures, but may encompass other event hierarchies as well.

The concept of a "Part" hierarchy is centered around the "Product" or "Service" which is the primary entity at which all parts are related to and branch from. A product or service corresponds to a set of capabilities, where the lowest level in the part hierarchy is where revenue can be assigned, and is the lowest level of the hierarchy at which a market category is created or attributed to. A product or service can have one or more capabilities which is the core unit the consumer interacts with. A "capability" is an independent set of features that is prominent enough to define a minimum product offering and is measurable, observable, upgradable, and potentially monetizable. Capabilities may have an API namespace if delivered as a software product or service and can have associated service level agreements (SLA). Capabilities can have configurable items in the instantiation of a feature. A feature is specific to a capability and can be enabled, metered, or tracked for usage. A simple way to think about a feature is something providing entities (noun) and associated actions and/or toggles (verbs) that can be performed (e.g. create, update, enable, disable) on the entities being provided. Using the noun/verb reference above a feature may have related features that define/provide traits (adjectives) specific to entities. To perform a unified analysis from different event hierarchies, the data items and/or entities from the event hierarchies can be commonly related to component(s) within the part hierarchy. It is this feature that permits some embodiments to overcome issues with conventional systems that relate data items or entities only to concepts applicable to within a single ecosystem or hierarchy.

In FIG. 4, the diagram is divided into four quadrants, where each quadrant represents a different event hierarchy. The lowest two quadrants correspond to Dev-related hierarchies. The lower left quadrant represents a developer hierarchy. This hierarchy pertains to systems used by and interfaced with software developer activities that are used to "build" the product (e.g., a software product). The lower right quadrant represents an operations hierarchy, which pertain to developer-related personnel that operates the systems/software for a computing product. The upper two quadrants correspond to Rev-related hierarchies. The upper right quadrant represents a support hierarchy. This hierarchy pertains to systems used by user and customer facing support personnel. The upper left quadrant represents the user/customer hierarchy, which pertain to and/or include the actual products being used by ordinary customers and users.

These four quadrants are illustrated to include a set of concentric rings which represent funneling stages for events generated by the different hierarchies. The outer ring encompasses the greatest area in the diagram, and represents the event data generated by the different hierarchies. From the outer event ring, the next ring corresponds to incident objects, which correspond to the next funneling stage from event objects. The next ring corresponds to the ticket objects, which is the next funneling stage from the incident objects. The next ring corresponds to the issue objects, which is the next funneling stage from the tickets objects. The diagram shows even more rings within these above-described rings, which relate to granular aspects of the products that were developed and used. For example, this figure shows a ring corresponding to the granularity of a "component" and/or "feature". Within this ring, the next level of granularity is another ring at the granularity of a "service", "microservice", and/or capability.

As previously noted, the lower left quadrant represents a developer hierarchy. This hierarchy pertains to systems used by and interfaced with software developer activities that are used to build the software product. At the event level, a non-exclusive list of sources for the event data may include service registry tools, security compliance analysis, continuous deployment tools, continuous integration tools, and/or version control systems. Examples of such sources that produce event data for this Dev quadrant may include Github, Gitlab, Git, CircleCL, Jenkins, Artifactory, and/or service registries (e.g., with regards to Kubernetes, consul, dns, etc.). The incident level may include, for example, integration engineers, project maintainers, and/or build engineers. Examples of incident-related objects are merge requests, fork/branch, pipeline/workflow milestones, job/stage completions, package creation, and/or artifact promotion/distribution. The ticket level may include, for example, test engineers. Examples of ticket-related objects are test failures, repo cloning, repo branching, pipeline updates, workflow tuning, job anomalies, security scan failures, artifact promotion, and/or canary rollout failures. The issues level may include, for example, the actual developers themselves. Examples of issue-related objects are product bugs and/or unit test bugs. At the component level, the system may autonomously learn about components based at least in part upon, for example, directory structures for the code and/or unit test directory location. At the service/microservice level, the system may autonomously learn about services based at least in part on, for example, service registries and/or load balancer proxies.

During an analysis stage, clustering, classification and/or communications operations may be performed upon the event data for this hierarchy. With regards to clustering, one or more of the following may be performed: (a) deduplication of incidents, (failed) workflows, and/or jobs; (b) correlation between upstream changes (e.g., in Git) and downstream failures (e.g., CI/CD failures); (c) anomaly detection; and/or (d) correlating code and test suites with components and (micro)services. With regards to classification, one or more of the following may be performed: (a) attribution; (b) prioritization; and/or (c) recommendation (e.g., garbage collect tickets and issues, promote tags to fields and demote fields to tags, hush noisy incidents, and detect alert spam). With regards to communications, one or more of the following may be performed: (a) context sensitive collaboration; (b) real time notification; and/or (c) cross-funnel propagation.

The lower right quadrant represents an operations hierarchy. At the event level, a non-exclusive list of sources for the event data may include image repositories, cloud monitoring tools, service mesh, service registry tools, observability tools, and/or infrastructures (e.g., Kubernetes). Examples of such sources that produce event data for this quadrant may include public cloud outages, network provider outages, service registries, and/or logs and log analytics. The incident level may include, for example, network security engineers, cloud operations engineers, and/or site reliability engineers. Examples of incident-related objects are artifact promotion, service uptime/performance, mesh upgrade failures, network breaches, A/B testing data, canary/staged rollout data, DDoS attack information, and/or observability anomalies. The ticket level may include, for example, devops engineers. Examples of ticket-related objects are artifact promotion/deployment failures, ingress/regress CRUD, mesh upgrade failures, canary rollout failures, and/or A/B testing tasks. The issues level may include, for example, the actual developers themselves. Examples of issue-related objects are product scale and performance bugs, upgrade bugs, feature rollout bugs, security holes, service-to-service compatibility bugs, and/or API gateway bugs. At the component level, the system may autonomously learn about, for example, correlations between customer features and source code components/teams for clustering and classification of issues. At the service/microservice level, the system may autonomously learn about, for example, correlations between customer features and service/teams for classification of tickets and issues.

During an analysis stage, clustering, classification and/or communications operations may be performed upon the event data for this hierarchy. With regards to clustering, one or more of the following may be performed: (a) deduplication of incidents, DDoS events, observability tool alerts, and/or service restarts (b) correlation between upstream artifact promotions and downstream service failures (c) anomaly detection; and/or (d) correlating code and test suites with components and (micro)services. With regards to classification, one or more of the following may be performed: (a) attribution; (b) prioritization; and/or (c) recommendation (e.g., garbage collect tickets and issues, promote tags to fields and demote fields to tags, hush noisy incidents, and detect alert spam). With regards to communications, one or more of the following may be performed: (a) context sensitive collaboration; (b) real time notification; and/or (c) cross-funnel propagation.

The upper right quadrant represents a support hierarchy. At the event level, a non-exclusive list of sources for the event data may include content delivery networks, social media, application stores, mobile applications, and/or a client browser. Examples of such sources that produce event data for this quadrant may include browsers (such as Chrome, Safari, Firefox), app stores (such as Apple App Store, Google Play), social media (such as Facebook, Instagram, Reddit, Twitter), and/or content delivery networks (such as Fastly, CloudFlare, CloudFront). The incident level may include, for example, L1 support engineers and/or a marketing analyst. Examples of incident-related objects pertain to client app/browser crash, app downloads, feature tracking, social comments, and/or chatbot requests. The ticket level may include, for example, L3 support engineers, sales engineers, and/or product manager. Examples of ticket-related objects pertain to a request for enhancement, a new feature request, regression in behavior/usability/performance/reliability, entitlement (e.g., licensing), API throttle, and/or user provisioning. The issues level may include, for example, the actual developers themselves. Examples of issue-related objects pertain to a request for enhancement, and/or regression in behavior/usability/performance/reliability. At the features level, the system may autonomously learn about, for example, correlations between product features and code components for the classification of tickets and issues. At the capabilities level, the system may autonomously learn about, for example, correlations between product capabilities and running services for classification of tickets and issues.

During an analysis stage, clustering, classification and/or communications operations may be performed upon the event data for this hierarchy. With regards to clustering, one or more of the following may be performed: (a) deduplication of incidents, clickstreams, social media alerts, cascading failures, cloud outages, and/or feature request tickets; (b) correlation between upstream artifact promotions and downstream customer tickets, cloud and network outages, and/or new feature rollouts; (c) anomaly detection; and/or (d) correlating code and test suites with features and capabilities. With regards to classification, one or more of the following may be performed: (a) attribution; (b) prioritization; and/or (c) recommendation (e.g., garbage collect tickets and issues, promote tags to fields and demote fields to tags, hush noisy incidents, and detect alert spam). With regards to communications, one or more of the following may be performed: (a) context sensitive collaboration; (b) real time notification; and/or (c) cross-funnel propagation.

The upper left quadrant represents a user/customer hierarchy. At the event level, a non-exclusive list of sources for the event data may include an organic clickstream, a billing system, payment gateways, website analytic tools, and/or CRM systems. The incident level may include, for example, finance managers, account managers, and/or product managers. Examples of incident-related objects pertain to shopping carts, paywalls, data for shipping/registration/payment/billing/invoicing, onboarding, retention, upgrades, purchase orders, upsell/cross-sell data, and/or customer references. The ticket level may include, for example, finance managers, account managers, and/or product managers. Examples of ticket-related objects pertain to data for churn/attribution/cancellation, credit card bounce, feature/API rollout, and/or catalog updates. The issues level may include, for example, revenue recognition bugs, design enhancements, and/or usage of third party APIs. At the features level, the system may autonomously learn about, for example, correlations between product features and code components for the classification of tickets and issues. At the capabilities level, the system may autonomously learn about, for example, correlations between product capabilities and running services for classification of tickets and issues.

During an analysis stage, clustering, classification and/or communications operations may be performed upon the event data for this hierarchy. With regards to clustering, one or more of the following may be performed: (a) deduplication of incidents, clickstreams, provisioning events, cascading failures, collection days, and/or large customer onboarding; (b) correlation between upstream feature/catalog/partner/API rollout and downstream customer tickets; (c) anomaly detection; and/or (d) correlating code and test suites with features and capabilities. With regards to classification, one or more of the following may be performed: (a) attribution; (b) prioritization; and/or (c) recommendation (e.g., garbage collect tickets and issues, promote tags to fields and demote fields to tags, hush noisy incidents, and detect alert spam). With regards to communications, one or more of the following may be performed: (a) context sensitive collaboration; (b) real-time notification; and/or (c) cross-funnel propagation.

Figure 5:
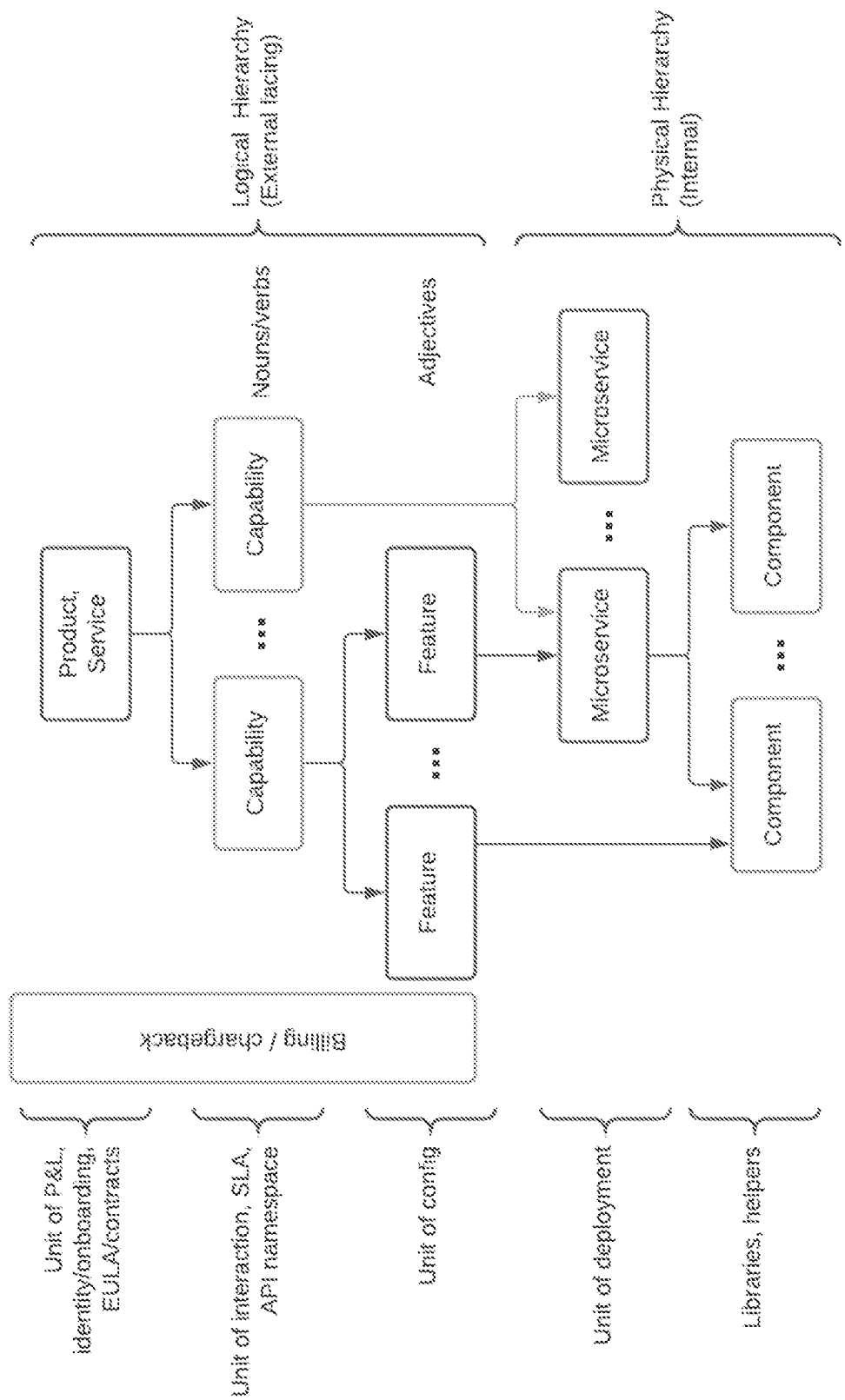
FIG. 5 illustrates a product or service hierarchy and how these entities relate to one another.

FIG. 5 illustrates a product or service hierarchy and how these entities relate to one another. The definition and standardization of a product or service hierarchy allow all events, work items and activities to be consistent, coordinated and visible across all of the quadrants and/or funnels.

The product or service is the origin entity that the part hierarchy (product or service hierarchy) is based upon. A product or service is defined as a unit of profit and loss, identity, onboarding and contracting. A product or service can have one or more capabilities which is the core unit the consumer interacts with. These may have an API namespace if delivered as a software product or service and can have associated service level agreements (SLA). A simple way to think about a capability is something providing entities (noun) and associated actions (verbs) that can be performed on the entities being provided. Capabilities can have configurable items in the instantiation of a feature. A feature is specific to a capability and is not commonly directly interacted with. Using the noun/verb reference above a feature may define/provide traits (adjectives) specific to entities.

These may link to backend constructs, termed microservice and component most commonly, if the organization is delivering software products. A microservice is a unit of deployment and may be one part which composes a feature or capability. A component is commonly something that is meant to be part of the system, but not the system as a whole.

Figure 6A:
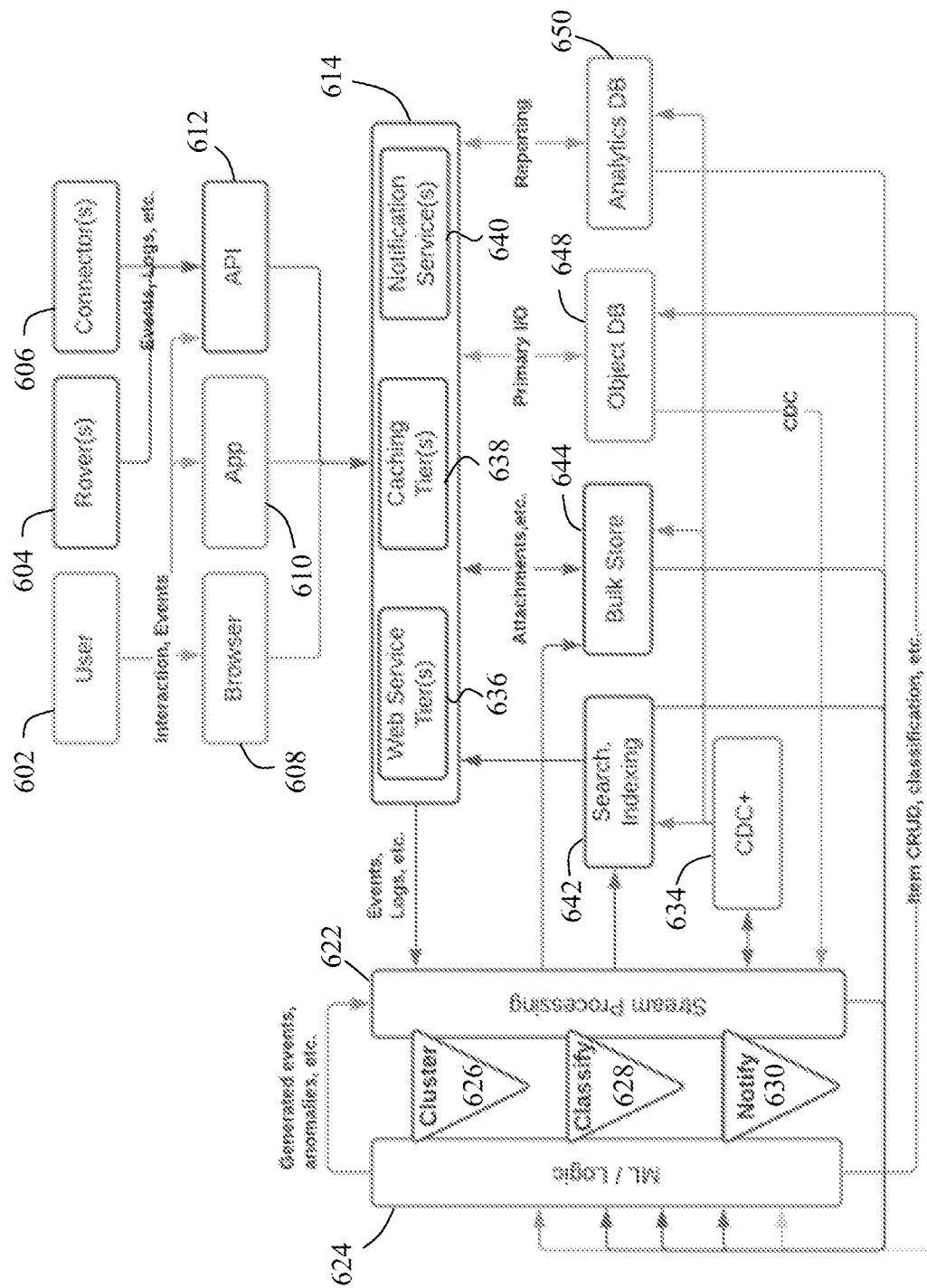
FIG. 6A shows an illustration of a system architecture diagram according to some embodiments of the invention, where a machine learning (ML) architecture is provided to implement the platform according to some embodiments of the invention.

FIG. 6A shows an illustration of a system architecture diagram according to some embodiments of the invention, where a machine learning (ML) architecture is provided to implement the platform according to some embodiments of the invention. One or more ML models in the ML architecture are implemented as part of the ML components in the system architecture, with the event streams and incident streams in the ML architecture part of the streams processing in the system architecture.

In FIG. 6A, the ML/Logic component 624 refers to a collection of machine learning modules that are listening to various event streams and interacting with the Object DB 648. These modules maintain their transient state using an in-memory database, referred to as In-mem DB 632 in the figure.

Overall, the ML/Logic component 624 is responsible for three primary tasks clustering 626, classification 628, and notification 630. Clustering 626 refers to the aggregation of multiple similar events or objects to a single meta-event or meta-object that captures some underlying commonality among these events or objects. Classification 628 refers to the assignment of an attribute of an object based on analysis of past assignments by the machine learning algorithm or humans. Finally, notification 630 refers to the act of sending out a message to a consumer that has registered interest in a certain class of events. However, in some embodiments, notifications are only sent when the event exceeds some threshold in terms of the rate of the event or the attributes of the event that would indicate an anomaly that is worth investigating.

Object DB 648 refers to a database of objects. The schema of these objects is described later in this document. The CDC (Change Data Capture) arrow from Object DB 648 to Stream Processing 622 refers to a process that captures incremental changes from the database and puts them on a logical queue for further processing using streaming algorithms.

The CDC+ component 634 is one of the consumers of the CDC data stream. The link between CDC+ 634 and the "Search, Indexing" module 642 refers to the process of creating an index of the objects in the Object DB 648 for faster retrieval. As objects change, the CDC+ component 634 incrementally updates the information in the index. The CDC+ arrow to the Bulk Store 644 refers to the process of archiving some or all of the objects in the Object DB 648 for long-term storage. As objects change, the updates are propagated to this archive. The CDC+ arrow to the Analytics DB 650 refers to the process of using incremental updates to the Object DB to maintain the results of expensive analytics queries without re-executing them from scratch.

The CDC+ component 634 also allows for enhanced version history, which can be used for a variety of use cases, including audit history, change invalidation/rollback, and the ability to compose a snapshot of the system and/or object at a specific point in time. With these composable snapshots, one can restore an object or organization's data to a specific point in time for troubleshooting or rollback.

Data is gathered into the system using any suitable data gathering approach, where rovers 604 and connectors 606 may be implemented to automatically collect data from source ecosystems. For example, connectors 606 may be used to collect data regarding development activities, events, and entity data from a development ecosystem. In addition, rovers 604 may be established on user systems to gather real-time events that occur based upon user activities. As such, one or more DBs (e.g., in the ML architecture) may be populated by the connectors are part of the object/bulk store in the system architecture. The Entities, Incidents, Tickets, and Issues DB in the ML architecture are part of the Object DB in the System architecture.

An embodiment of the invention may include rovers 604 for each of the possible event sources listed above. The rover collects events from the sources into the centralized database either by pulling through API calls provided by the event source or by pushing from the source by adding a few lines of code that sends the data directly to a central database.

In parallel to rovers, and to supplement the information in events, connectors 606 obtain information about various systems of records that are used by the Dev organization from source code control to CRM systems to deployment systems. These databases are de-duplicated in an Entity DB that is maintained by the invention. The Entity DB also records the relationships between these entities.

In some embodiments, the rover 604 may operate with a "pull" approach, which provides a one-way path to obtain information into the system and operates as a data-feed into the platform. This approach to obtain information works very well with data sources that just need to be consumed without necessarily needing synchronization in the other direction, such as a log file or message store. In contrast, the connector 606 in this embodiment is bi-directional in nature, and it synchronizes between entities in an external system to the current analysis platform, and which permits information to be published in both directions. The connector therefore requires a greater level of access, which may necessitate the establishment of privileges, creation of an ongoing session, and/or permission to create or update entities at the remote/user/source/customer site. To illustrate the different scenarios in which a rover may be used instead of a connector, or vice versa, consider a software development organization that may use a software source control system to manage its coding projects. If there is a desire to merely publish events to the current platform, then a one-way pull component such as a rover 604 may be used to acquire information from that source code control system. On the other hand, perhaps the user would desire the ability to have the current platform be able to open, update or close issues that are created in the source code control system, based upon analysis that occurred using the current unified platform. A connector 606 would be able to implement the two-way communications that would allow the issues in the external system to be created, updated, or closed.

Information may also be collected from a user 602. The information may be obtained from the user 602 through a browser 608. The user may also be providing information through an application 610. The user may also interact with the platform through an API 612. These are all possible conduits through which the user 602 may interact with the platform e.g., to provide information and/or to operate the system, e.g., to query the system, obtain notification communication, perform analytics, etc. In some embodiments, the browser 608 and application 610 may also communicate to the platform using the API 612. For example, the application 610 may include hooks to publish events into the platform, e.g., using the API 612. The browser and/or application may leverage localized techniques to run some services locally, leveraging technologies like web-assembly (WASM) to perform some operations like authorization, policy control, etc.

The system architecture includes a platform front-end 614 to interface with external systems and entities. The platform front-end 614 handles requests and information from external locations, and to send responses back to the external locations. The platform front-end 614 receives event information from the rovers 604, connectors 606, and users 602, and directs the collected information to the appropriate processing and/or storage location within the platform.

In the front end 614, a caching tier 638 may include one or more cache components (e.g., memory, SSDs) and/or locations (client device, edge (CDN), origin) to cache data received from external sources in an in-bound direction and/or communications intended to be sent to an external entity in an outbound direction. The caching tier is useful, for instance, to efficiently send data without necessarily going back to the source of that data. By way of example, assume that there is information in the object DB 648 to be sent to an external system. Rather than constantly accessing that information from the object DB, the information can be instead cached in the caching tier 638. A key approach to the platform caching strategy is inverting traditional delivery models which rely on CDNs to only cache static content to something that enables caching of responses at the edge (edge compute and CDN) as well as platforming services at the edge to perform common functions like request augmentation, authentication, authorization, routing and additional platform services.

The notification services 640 provide notification to an external location, e.g., using the operation of the connector 606 to update an external entity, direct information to the browser 608 or application 610 for a given user 602, or provide a push notification, for example, notifications about updates to tickets or issues. The notification may not only be to users of the platform (e.g., e.g., engineers or support personnel for a software development company), but may also be made to the customers as well of the user (the end-user of the product created by the software developer that is the user of the current platform).

One or more web service tiers 636 may be employed to act as API gateways to handle API requests and to handle both content subject matter and routing functionality. For example, with regards to context, this component will add context to requests with augmentation, e.g., by pulling the appropriate javascript or HTML pertinent to a given request. With regards to routing, the web service tier 636 will send collected information and data to the appropriate component in the system, e.g., events and logs are sent to the stream processor 622, large data items such as attachments are sent to/from the bulk store 644, reporting items are sent to/from the analytics DB 650, primary I/O items are sent to/from the object DB 648, and/or search/indexing information are sent to/from component 642.

The embodiments of the invention are compatible with all event types that are relevant for the functioning of a software organization. They are not restricted to but include the following: (a) Developer: Build, test, and deploy events from tools such as GitHub, GitLab, CircleCI, Artifactory, Envoy, and Istio; (b) Operations: Operate, and manage events from tools such as DataDog, Splunk, AppDynamics, NewRelic, Prometheus; (c) Support: Customer engagement, including omnichannel communication (voice, video, email, chat), and events from social media, client browsers; and/or (d) CRM/Rev: Customer journey events including clickstream events from tools such as Salesforce, Pendo, Gainsight, Mixpanel, Adobe CDP, Clickstream and Segment.

The collected events are clustered into incidents that are classified as good or bad. No human intervention is required for creating incidents. The presence of multiple similar events that occur close in time and or have similar content is sufficient to help create the incidents. The incidents are presented to the user and based on user feedback the notion of similarity may be tuned. The invention is compatible with any notion of similarity, and the invention may be implemented using any suitable similarity algorithms, such as for example, Bloom filters, vector space embedding or other approximate matching algorithms such as edit distance, but it is not restricted to them.

Incidents are further clustered into tickets that are given a priority and assigned to a developer working in the software organization. Some embodiments implement ticket clustering by considering an evidence trail, performing correlation between different types of incidents, and/or performing prioritizations. With regards to an evidence trail, the creation of a ticket is based on the clustering of multiple incidents which in turn are created from events. The generated ticket presents this clustering history as justification of the ticket. The most relevant information from the events that are part of the ticket are included in the ticket to make triaging easier. For example, deployment related tickets may include snippets of logs, traces and alerts which are related. With regards to correlation between different types of incidents, incidents that are created in different parts of the software organization are correlated together when a ticket is created to ensure that it is assigned to the correct person and given the appropriate priority. For example issues that are created from fatal errors in Ops may be linked to login delay issues in Growth and these may in turn link to errors in testing that are in turn linked to code commit events. Thus, an assignment of a ticket to a developer can be explained in terms of the correlation between incidents. With regards to prioritization, any suitable type of prioritization may be used. For example, prioritizations may be based at least in part on revenue impacts. The correlation of incidents from the CI/CD, Ops, and Growth side allows the determination of the impact of the incidents to customers and based on billing data from the CRM systems a revenue number is assigned to the ticket. This allows the priority to be directly linked to the software organization's revenue.

Finally, after root cause analysis is performed on the tickets, some of these tickets are combined into issues. An issue represents a recurring long-term failing in a product or service offered by the organization that needs a systematic redesign.

Figure 6B:
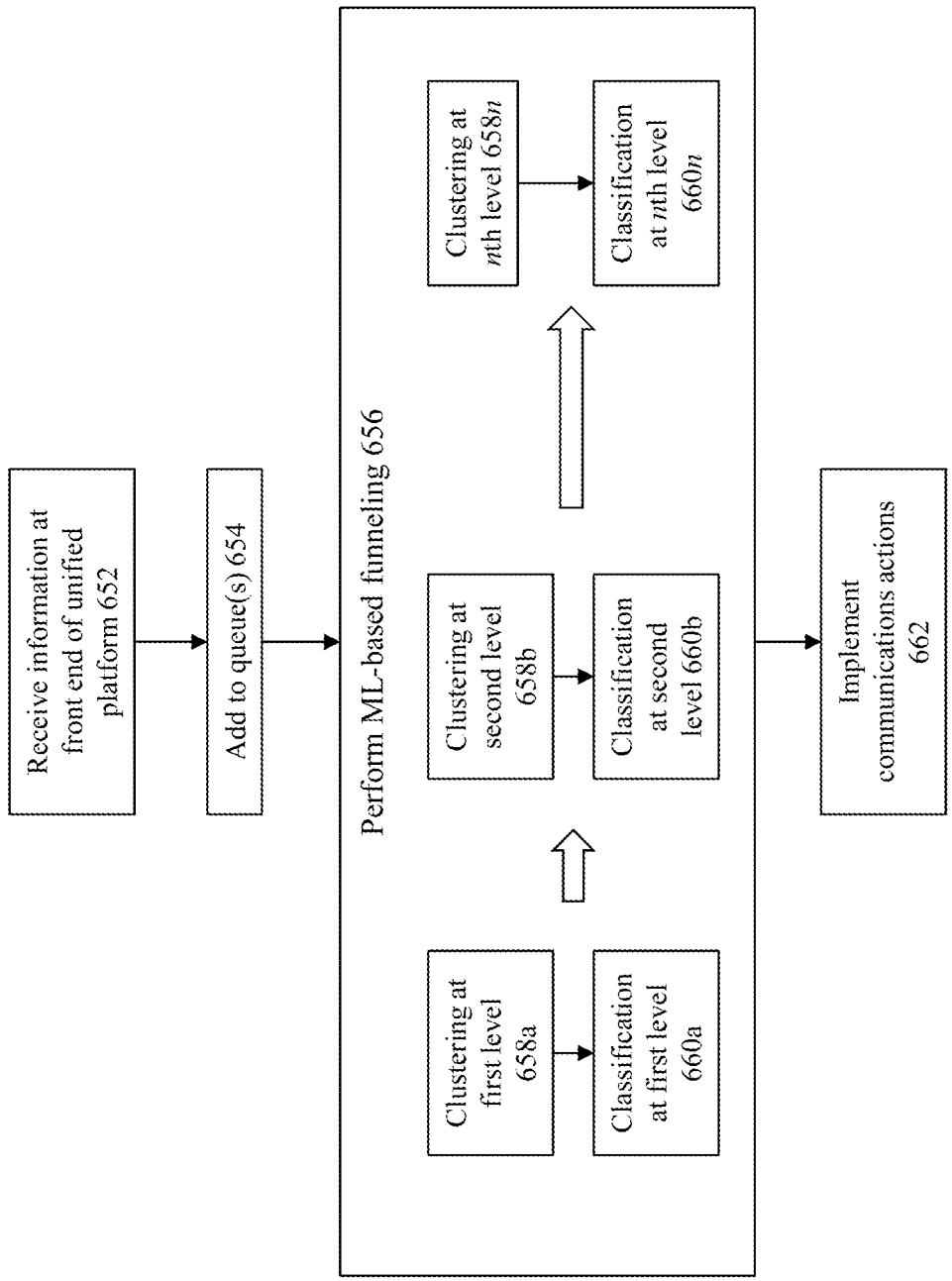
FIG. 6B shows a flowchart of an approach to perform multi-hierarchy analysis using machine learning in a unified platform according to some embodiments of the invention.

FIG. 6B shows a flowchart of an approach to perform multi-hierarchy analysis using machine learning in a unified platform according to some embodiments of the invention. At 652, the front-end component of the unified platform receives information from multiple external hierarchies. It is noted that in some embodiments, the unified platform is implemented as a cloud service, e.g., using a software-a-a-service (SaaS) model, where the user of the service provided by the unified platform is an organization or company that develops of manufactures a product for end-users/customers. The front end of the unified platform therefore may interface with sources of information from numerous disparate hierarchies or ecosystems, including development systems from the user of the unified platform (there developer or manufacturer) and/or the customers of the user/developer/manufacturer, as well as other systems pertains to support or operation of the developed products.

At 654, the incoming information is placed into one or more event queues for consumption by downstream ML-based processing. In the architecture of FIG. 6A, the event queues may be located, for example, within the stream processing component 622. Different types of incoming information may be processed using different queues. For example, the event streams for information collected by rovers (e.g., log data or stack traces) may be collected and placed into a first set of one or more queues for processing based upon "incident models". In contrast, the event streams for information collected by the connectors (e.g., CRUD events or pipelines) may be collected and placed into a second set of one or more queues for processing based upon "entity models".

At 656, ML-based funneling is performed upon the event data. This action implements a series of stages that will funnel the data into more meaningful sets of analyzed data as the object progress through the different stages of processing. The raw event data from the multiple hierarchies/ecosystems correspond to an extremely large volume of data, which is analyzed in a unified way across the different hierarchies, and is used to form increasingly smaller and more meaningful sets of data.

At each granular level of the funneling analysis, clustering 658 and/or classification 660 are performed upon the data. Clustering refers to the aggregation of multiple similar events or objects to a single meta-event or meta-object that captures some underlying commonality among these events or objects. A set of ML-based models are used to perform clustering on the collected data, where to goal to perform a unified funneling action upon data from multiple hierarchies. Classification refers to the assignment of an attribute of an object based on analysis of past assignments by the machine learning algorithm or humans.

The general idea is that event data from multiple ecosystems may be received from external sources, where clustering analysis is performed in a unified manner across that collected data such that cross-hierarchy/ecosystem analysis is performed upon that data. With regards to funneling, ML analysis is performed at different levels of granularity, and each level of granularities reduces the overall data to a smaller and more meaningful set of data for the next level of granularity, and a different ML model may be used at each level of granularity.

At 662, communications/notification are performed. This action in some embodiments is performed to send out one or more messages to various external systems or entities. Each type of notification may be specific to a given consumer that has registered interest in a certain class of events. For example, a first type of notification may be sent to the developer user of the system, e.g., with regards to issues pertaining to software coding issues. A second type of notification may be sent to an end-consumer of the product, who may be the customers of the developer user.

Figure 7:
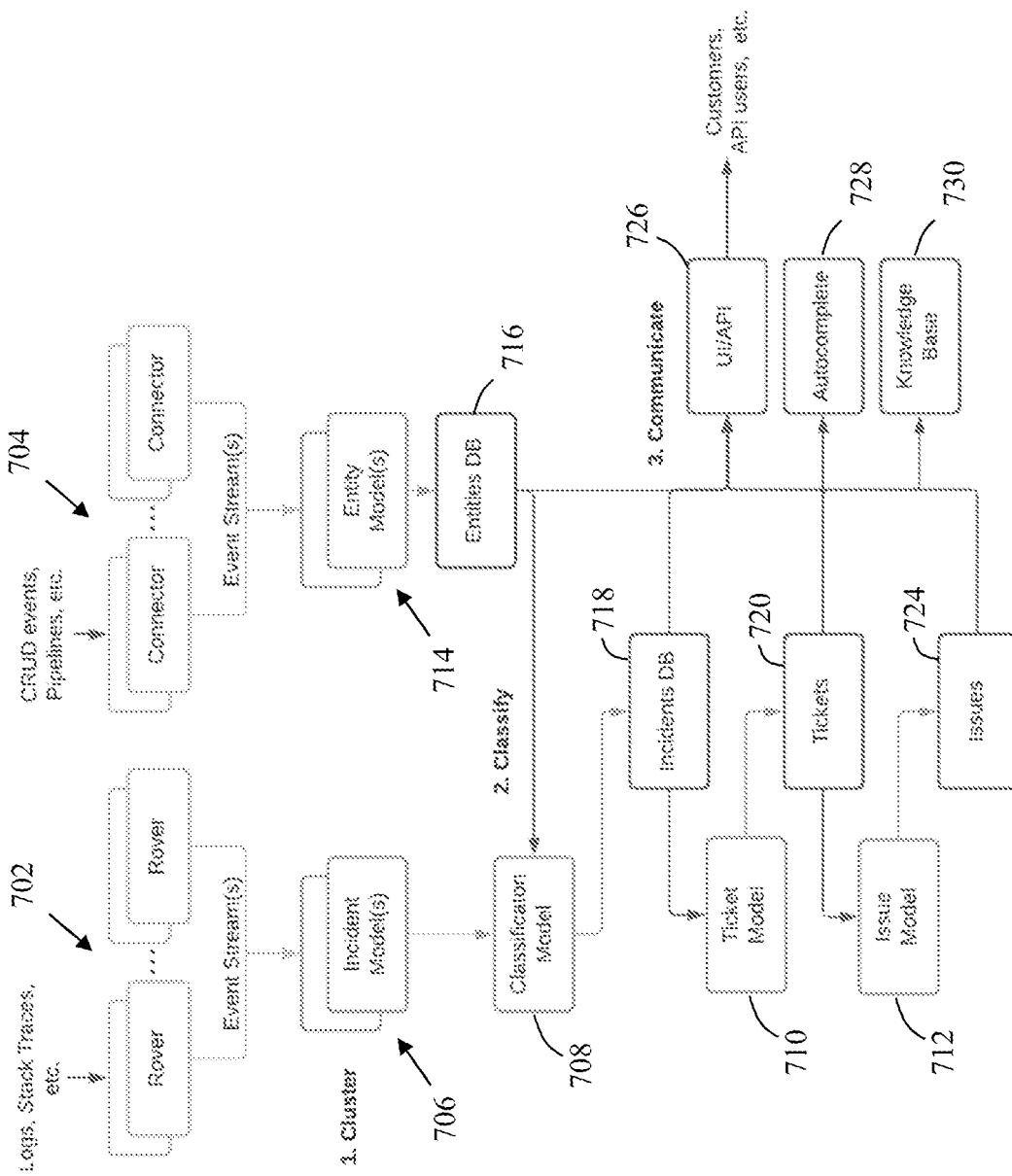
FIG. 7 provides an illustration of a machine learning (ML) architecture according to some embodiments of the invention.

FIG. 7 provides an illustration of a machine learning (ML) architecture according to some embodiments of the invention. The ML models in the ML architecture are part of the ML components in the system architecture diagram.

Here, the event streams and incident streams in the ML architecture are part of the streams processing in the system architecture. In particular, the rovers collect event streams 702 for information such as log data or stack traces that are provided for analysis to one or more incident models 706. In contrast, the connectors collect event streams 704 for information such as CRUD events or pipelines that may be provided for analysis by one or more entity models. In this embodiment, the connectors more focused on the entities, rather than events that those entities are producing, e.g., for a particular customer or customer system. As such, the information from the connector would be processed with respect to the entity models 714. In some cases, a connector may include a rover as part of it, and thus the connector may produce a first stream of event data from its rover for the incident model, and a second stream of event data for the entity model.

The event stream data then undergoes both clustering and classification. The clustering operations will use a respective model to perform grouping operations on data objects based upon whether the data either looks similar or do not look similar to each other. Clustering may operate in this system at different granularity levels. For example, clustering may occur at the incident level using incident model 706, at the entity level using entity model 714, for classification using classification model 708, for ticket identification using ticket model 710, or to identify issues using the issue model 712.

The clustered data may then be further analyzed and augmented with more contextual information by performing classification upon the clustered data. The classification operations may, for example, classify the data into problem groupings or non-problem groupings. The classification operations may produce entity classifications that are stored into an entity DB 716, incident classifications that are stored in an incident DB 718, ticket classifications that are stored as ticket objects 720, and issue classifications that are stored as issue objects 724.

Communications and/or notifications may occur at various points within the system. For example, a UI/API 726 may be used to communicate information to API users, customers, or any other external person or entity. One or more auto-complete operations 728 may be performed to automatically complete or update various external systems, fields, or entities. In addition, data and analysis results may be used to populate a knowledgebase 730.

Regarding details of the ML processing and the ML models themselves, the incident models 706 read from multiple event streams and output to an incident stream. These models learn to find the similarity between events of a certain kind so that they may be combined into an incident. These models are responsible for clustering within a single event hierarchy. Some examples may include: (a) reading test failure events over multiple test pipelines or within a single pipeline to determine that there is an test environment failure incident; (b) reading user tracking events from multiple rev users to determine that there is an incident whereby many users are seeing delays in logins; (c) reading ops alert events over time to determine that there is an incident whereby a service is not performing optimally; and/or (d) noticing a spike in the number of ops alerts above usual levels.

Similarities between events are learned by looking at events that occur close in time and that are close in content. These models get positive feedback when an incident is made part of a ticket or when an incident is not dismissed by the user.

The incident models are trained automatically from the event streams that a Dev organization is subscribing to in each of the event hierarchies. A specialized tokenizer can be used for each event stream to extract the most relevant tokens. An embedding layer is used to map the tokens in each event type to vectors. The embedding layer learns the pattern of tokens in each event and the sequence and co-occurrence of events to learn appropriate embeddings. This training is done without any manual intervention in some embodiments. An embedding model is produced that is saved persistently and relevant portions of it are cached as events are processed. A kNN (k nearest neighbor) indexing layer provides the ability to quickly find similar events.

The entity model 714 reads from various databases (e.g., Dev databases) that provide information about the raw entities in the Dev and the Rev organizations. This model deduplicates repeat mentions of entities across these databases and learns their relationships which are then all written out to the Entities DB 716. Some of the entities that are learned include: (a) which developers work in the dev organization; (b) what code repositories are owned by the dev organization; (c) which code files are part of these repositories; (d) which developer owns which repository/files; (e) which repository/file provides what code component; (f) what services are deployed; (g) who are the rev users and which rev orgs do they belong to; (h) what products/capabilities/features are provided by the dev organization; (i) which rev user is signed up for which product/capability/feature; and/or ( ) which product/capability/feature relies on what code component and which service is it deployed on.

The classification model 708 may also be referred to in some embodiments as an ML entity reference resolution model. This entity reference resolution model reads the incidents database 718 as well as the entity database 716 to identify which entities are referenced in each incident. Some examples may include: (a) which product/capability/feature is referenced in a rev user tracking incident; (b) which code component is referenced in a test failure incident; and/or (c) which ops service is referenced in an alert log incident.

The tickets creation model 710 reads from the incidents database 718 and determines whether a ticket should be created out of an incident. It also determines whether some of the incidents should be linked together in the ticket. Some of the linkage examples may include: (a) determining that an incident related to slow logins coming from rev user tracking events is linked to an incident created from alert events reported by an ops service; and/or (b) determining that multiple test failure incidents are related to a single code commit. This model is trained by identifying similar incidents that occur over a long period of time and also by user created tickets that are linked to incidents by the users.

The issue creation model 712 links together issues that are related to a common underlying root cause in the product. This model learns to distinguish between tickets caused by transient environment failures versus those caused by inherent flaws in the product itself. While tickets describe problems being experienced by a single Rev OID (organization identifier/ID), an issue may spans all/multiple Rev OIDs and references the underlying product.

Correlation of incidents across the event hierarchies allows the assignment of appropriate severity and priority. Correlation across event hierarchies also allows for appropriate attribution.

Auto-completion 728 may be implemented using an auto-completion model that tracks all the fields that the users are entering in tickets and issues and learns to fill in these fields. It also learns to detect fields that are deprecated and should not be filled in as well as fields that are required to be filled in conjunction with other fields. The autocompletion model also clusters issues and tickets and provides recommendations for similar issues and tickets to be linked. It also links in appropriate incidents and events that may provide additional context for the ticket or issue. For example log files for errors encountered in Ops.

The knowledgebase 730 may be populated using a knowledgebase model that identifies knowledgebase articles that are most relevant to a ticket and suggests these to users that are trying to create tickets and issues. The model autonomously creates knowledgebase articles based on common frequently occurring remedial steps that are entered into ticket descriptions by dev users.

Some embodiments pertain to an object model to implement the invention. In the below description of the object model, the term "TechCompany" refers to the company providing the invention described here. In the object model, various TechCompany terms may be employed. The term "dev org" refers to the TechCompany's direct customer (account). In the case of TechCompany itself, this will be its own dev org and its customer's (rev-org) would each be their own dev org. The term "dev oid" refers to the the unique ID assigned to the dev-org. In some embodiments, the TechCompany is assigned to a dev oid=0. The term "dev user" refers to the TechCompany's direct users. These are part of the Dev-org. The term "dev uid" refers to the unique ID assigned to the dev org's user. The term "dev cloud" refers to where the Dev's Products/Services sit.

The term "rev org" refers to the TechCompany's customer's customer (account), which will be on boarded onto TechCompany by the dev org. The term "rev oid" refers to the unique ID assigned to the rev org. The term "rev user" refers to the TechCompany's customer's users, and are part of the Rev org. The term "rev uid" refers to the unique ID assigned to the rev org's user. The term "rev cloud" is where the Dev's Customers sit. Given how the TechCompany is a normal user of their platform, their native commerce capabilities can be applied not only for themselves and their customers (dev orgs) but also provided as a service to their customers (rev orgs).

The term "rover" refers to a log/event collector which provides logs/events to the TechCompany platform. These can be collecting both machine or user generated items, and can sit in the Dev "cloud", Rev "cloud", TechCompany "cloud" or external. A "connector" is used to synchronize entities between systems. Connectors may synchronize objects bi-directionally in addition to creating objects in the source system.

The term "part" refers to a component or piece of the product or service hierarchy. Example parts include: Product, service, capability, feature, microservice, component, etc. The term "work item" refers to any artifact in the system that requires any work/activities to be performed. Example work items include: a ticket, issue or task.

An "event" is a granular item generated by a system, user, application, rover, etc. These are things that are commonly not of interest by themselves, however certain types of events may be of interest (e.g. test failure, etc.). Example events include: (a) alert; (b) stack trace; (c) test fail/pass; (d) system generated event (e.g. user crud, ticket creation, etc.).

An "incident" is used to group events by space and time into a clustered unit called an incident. Incidents are things of interest to humans/systems and are important for notification, however any action may not be necessary. For example, consider a critical error that occurs for a failed test. To gather context, one can look at relevant events leading up to the failure (e.g. user actions, logs, etc.) and cluster these together into an incident. In essence, an incident allows the system to gather context by combining relevant and related events and memorializing them with an incident (artifact).

Various terms in the object model may pertain to work management. The term "project" may pertain to an ephemeral/medium term series of work which be exist as part of a product or service capability. For things that are longer running or require coordination/collaboration it is preferable to create a project vs unconnected issues. Things that require phasing should be run as part of a project. For example, for a new release/version, this may pertain: (a) has associated issues for new features/bugs; (b) has associated marketing collateral, such as product collateral, website/digital updates, and/or documentation. This may also pertain to development of a new capability.

The term "issue" pertains to something requiring back-office work (people writing code, etc.), and may relate to a new feature, a bug fix, etc. Some example characteristics may include, for instance, duration of days/weeks/months, involve writing code (if development product), and/or has a higher impact/risk potential. Examples may include a new feature for a capability or a bug fix for a feature.

The term "ticket" pertains to something requiring front-office work. This may be triaged to see if additional work/investigation is required. A ticket can be escalated/linked to an issue. Characteristics of the ticket may include some or all of: (a) Duration of minutes/hours; (b) Can be minor configuration/test changes; (c) Can be a minor activity (e.g. reset password); (d) Lower impact/lower risk potential. Examples may include a customer support ticket or an auto generated ticket from ML.

The term "task" is a granular item of work performed by an associated owner, and may be a task which is part of a ticket or issue. Examples may include peer review, unit tests, etc.

Various terms in the object model may pertain to work management. The term "development environment" refers to a repository such as a source code repository. Examples include GitHub, GitLab, Git, etc. The term "version" pertains to a specific version cut from a branch at a specific time (commit). This can be a release version or not. The term "branch" refers to a git branch which can be cut from another branch. The term "CI/CD" refers to continuous integration/continuous deployment, which refers to the development methodology in which the development lifecycle and associated testing/push to product is much more automated/streamlined. Common tools have automated workflows/pipelines to handle testing and deployment. The term "test environment" refers to an environment where code is deployed and tests are run.

Various terms in the object model may pertain to a parts hierarchy (e.g., for a product or service). A product is the highest level of hierarchy in the product stack and the parent of related capabilities and features (a hub or peak). Products typically have the following characteristics: (a) Units of revenue (have P&L); (b) Basis for contracts; (c) Level at which customers are onboarded. A "capability" refers to a subunit of a product and is most commonly associated with the services a product provides. Capabilities typically have the following characteristics: (a) Services; (b) Unit of API scope (e.g. capability 1 vs. capability 2); (c) Unit of licensing/pricing. An example is a TechCompany's work management service (ticketing, issues, etc.). A "feature" is a subunit of a capability and is typically something that the users can control via a flag or something they can experience indirectly. Features typically have the following characteristics: (a) Can be controlled via flags (e.g. on/off); (b) May or may not be visible to end user. Examples may include a TechCompany's work management services or automatic ticket creation, automated issue prioritization, etc.

At a physical level, a "microservice" or "service" can correspond to a generalized service or more granular "micro" service. These typically directly map to a Product's capability or feature which can be composed of one of more services. Services are a unit of functionality that is meant to be deployed independently and reused by multiple systems. Services typically have the following characteristics: (a) expose an API; (b) may be directly interacted with via an API/UI by the end customer; (c) may be published in a service registry/load balancer (Envoy, etc.). A "component" refers to a unit of functionality that is designed to be part of a system or application. A component corresponds to a library that can be used by multiple microservices. Components typically have the characteristics of support for various services though not commonly interacted with by the end customer. An "environment" pertains to the notion of a run time, and may correspond to the client's environment (e.g. browser). This can be the runtime for the dev-orgs service/software/build.

Figure 8:
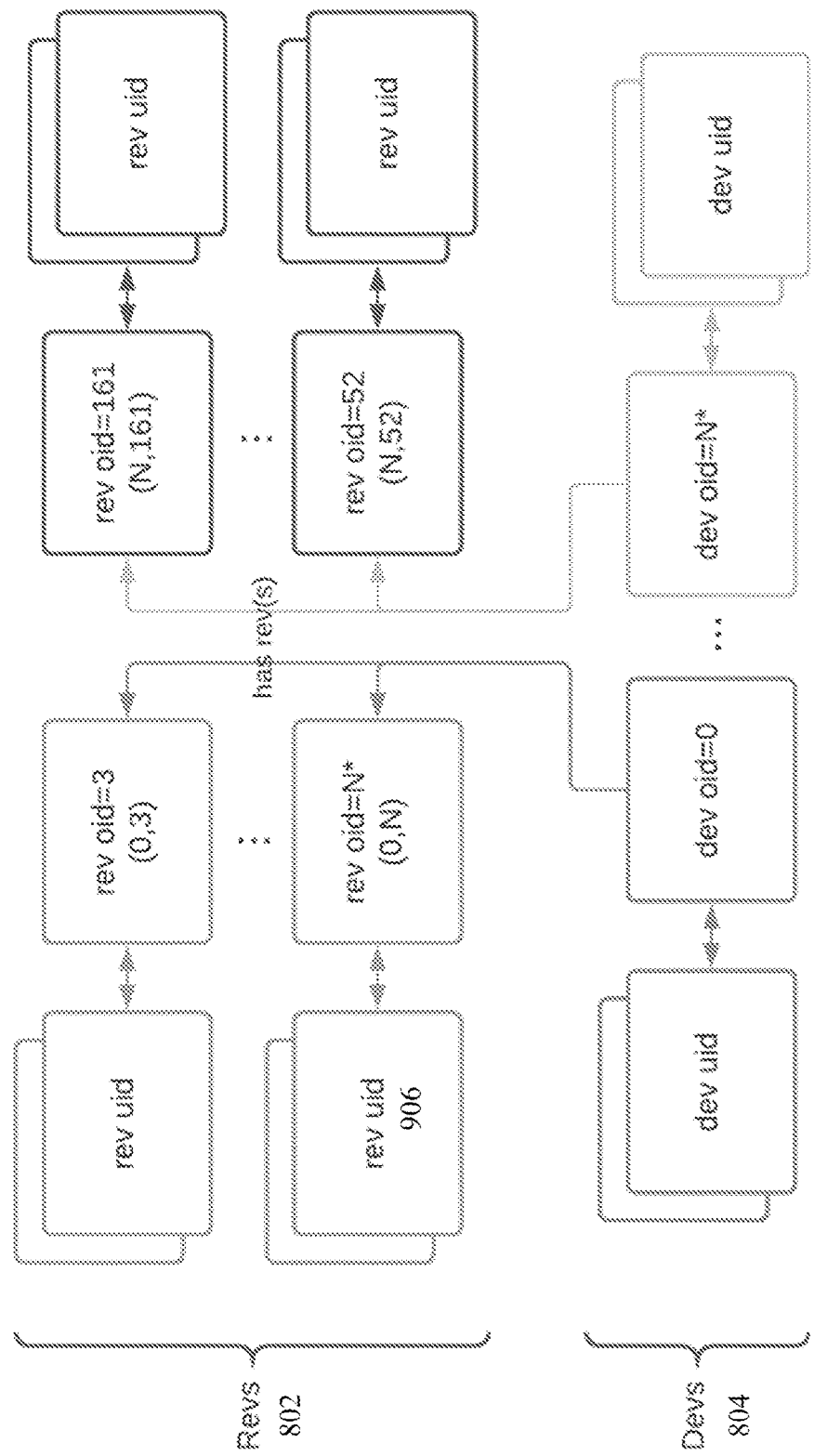
FIG. 8 shows an illustration of logical relationships that may exist between dev/rev orgs/users.

FIG. 8 shows an illustration of logical relationships that may exist between the user and orgs for Dev 804 and Rev 802. TechCompany's customers (Revs) will have their dev_o_id set to their rev_o_id. This will ensure that individuals will not get confused as their id (whether as TechCompany's Rev, or as its own Dev) is the same.

Figure 9:
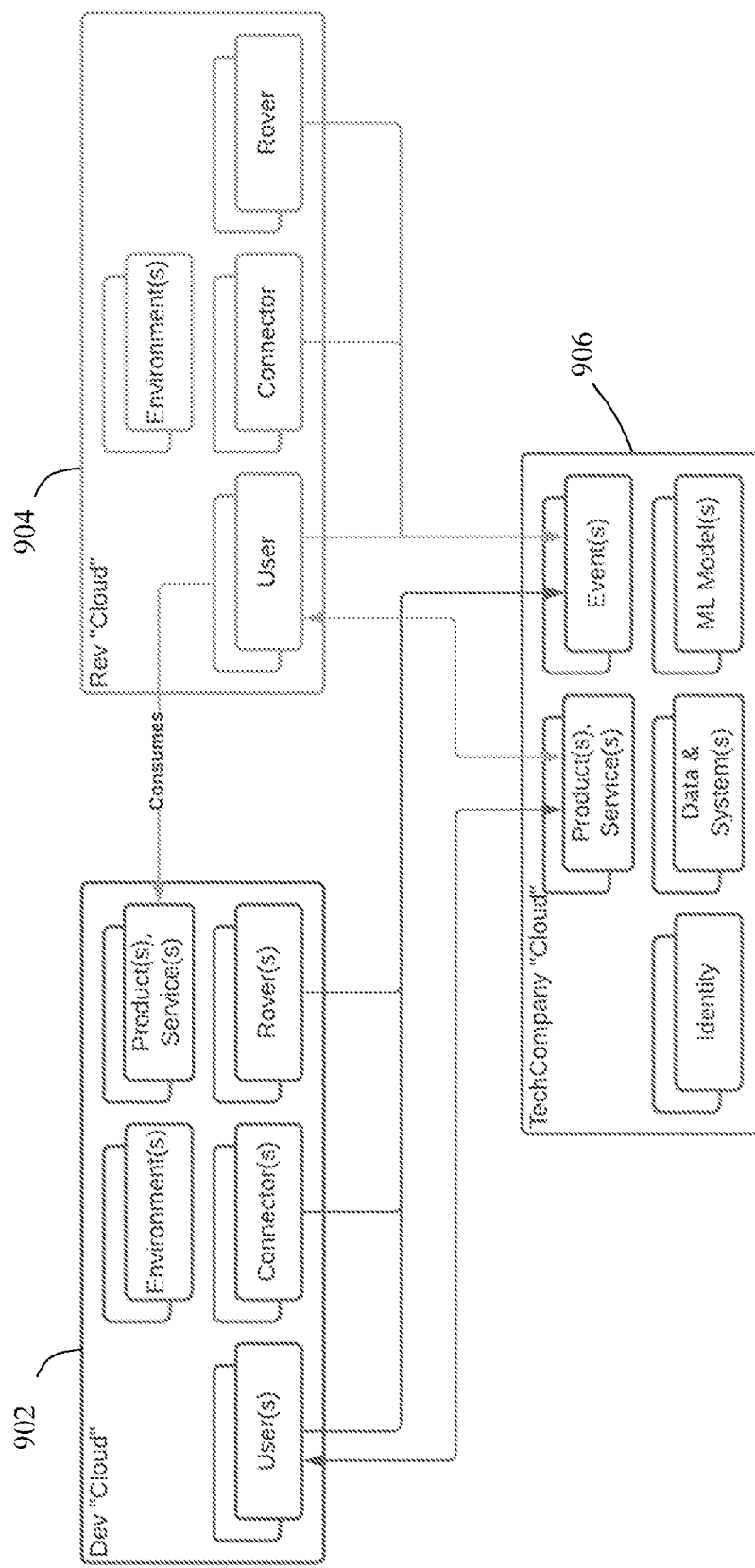
FIG. 9 shows example identity relationships between the different clouds according to one embodiment of the invention.

FIG. 9 shows example identity relationships between the different clouds according to one embodiment of the invention. This diagram shows a Dev cloud 902, Rev cloud 904, and a TechCompany cloud 906, where TechCompany is the organization that provides the above-described unified platform. The Dev cloud 902 may include users, environments, and products/services. One or more connectors and rovers may be included in the Dev cloud 902 to gather event information to be analyzed in the TechCompany cloud 906. The Rev cloud 904 may include users and environments. One or more connectors and rovers may also be included in the Rev cloud 904 to gather event information to be analyzed in the TechCompany cloud 906. The TechCompany cloud 906 may correspond to components for the events and the products/services. Mechanisms/components are included to perform identification, implement data and systems, and ML models.

Figure 11:
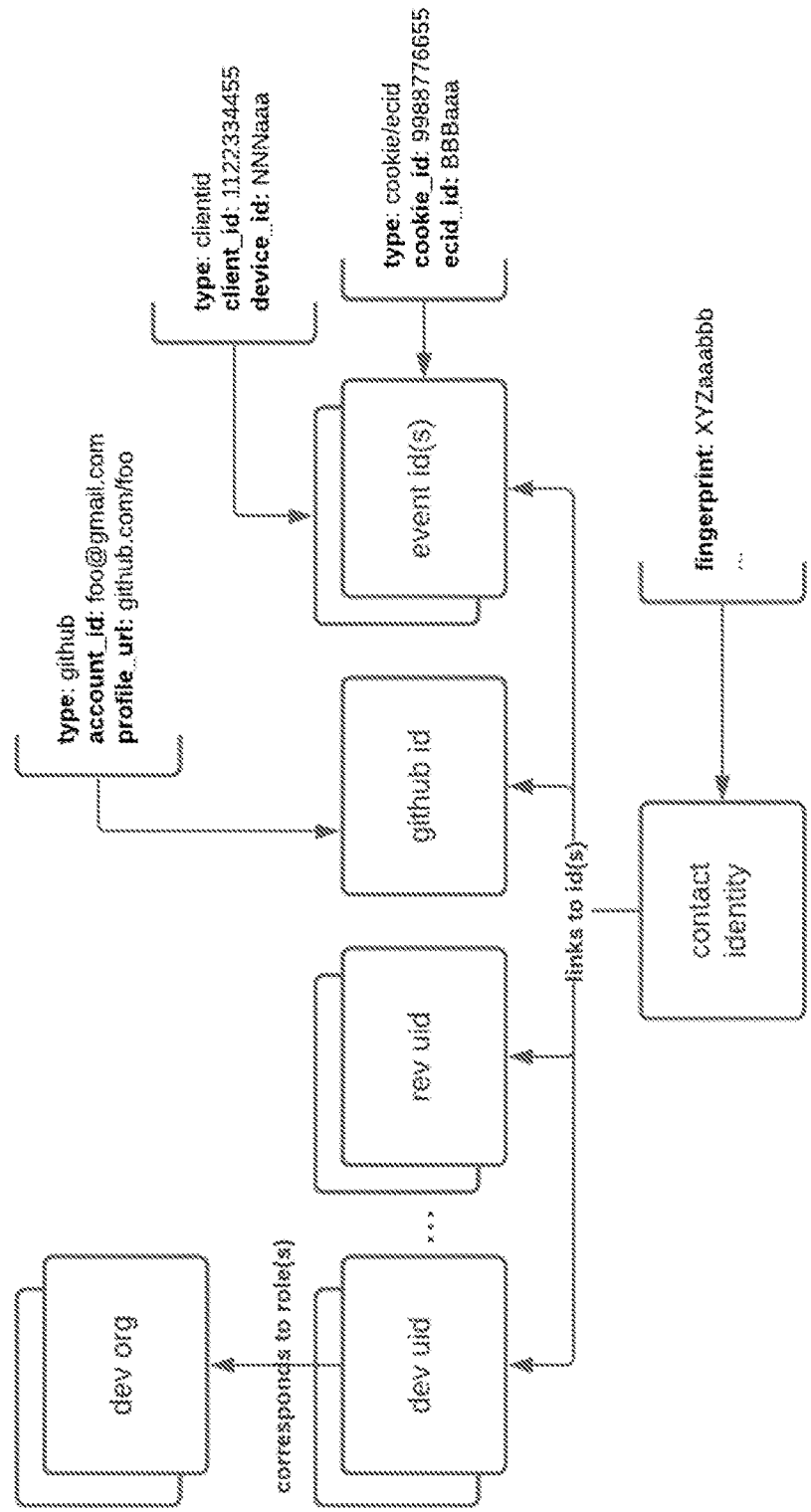
FIG. 11 illustrates the notion of identity and how a person's identity can be composed of multiple user IDs or traits.

FIG. 11 illustrates the notion of identity and how a person's identity can be composed of multiple user ids or traits. Core to the system is the concept of identity and linked system user ids (dev or rev uid), external accounts, identifiers (e.g. CRM id, etc.) and event identifiers (e.g. cookie id, device id). These can be linked together with a contact identity using identifying characteristics (email, cell phone, etc.) or upon request by the individual. The ability to consolidate common attributes of a user in the platform permits the system to gather characteristics of the user across multiple organizations and/or sources which may be used to guide targeting and/or provide insights back to the Devs using details of users derived from the platform as a whole. This also gives control back to the user where they can "own" their profile which is decoupled from their user account within the Dev or Rev org.

Figure 12:
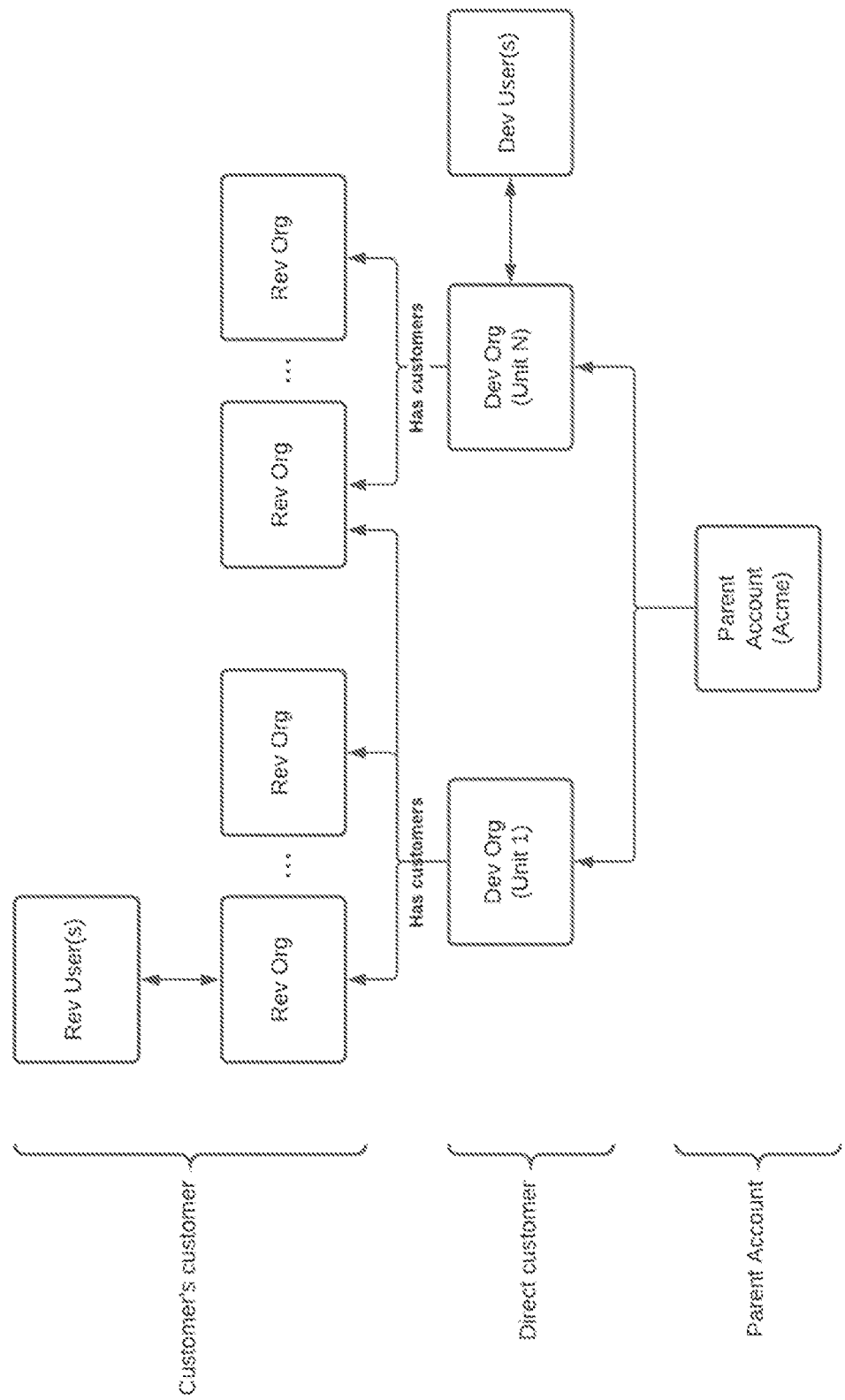
FIG. 12 illustrates the concept of TechCompany's direct customer (Devs) and their customers (Revs) and the fact that many Devs may correspond to a single entity.

FIG. 12 illustrates the concept of TechCompany's direct customer (Devs) and their customers (Revs) and the fact that many Devs may correspond to a single entity. In this figure the parent account is the legal entity which multiple customers (Devs) may belong or be linked to. It is not uncommon that individual business units may consume the system directly and be direct customers (Devs). The notion of a parent account can be leveraged for consolidated billing, provisioning, user management, etc. Each Dev has their internal users (Dev users) and respective customers (Revs) which in turn have their associated users (Rev users). A Rev may be a customer of multiple Devs under the same parent account.

Figure 10:
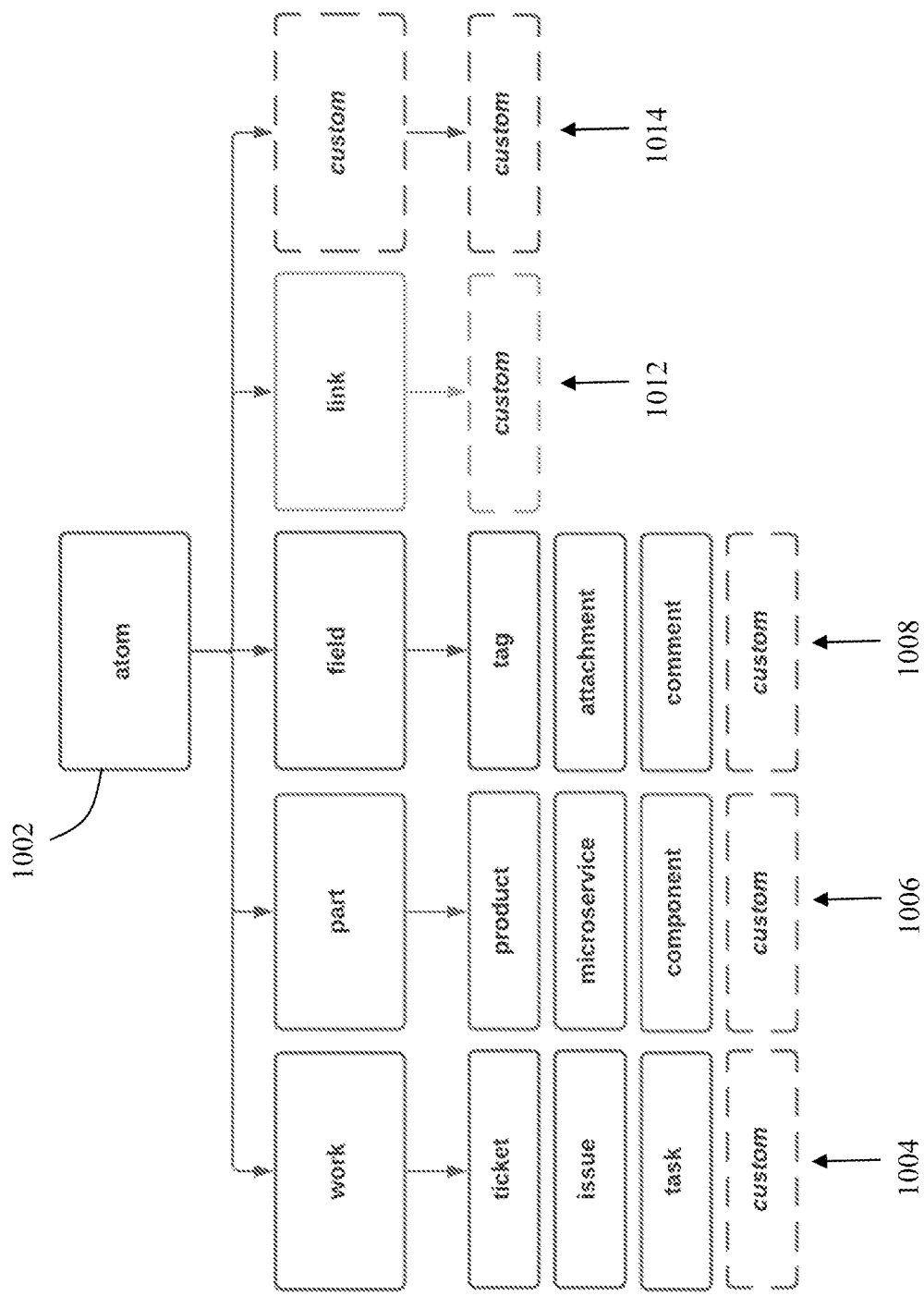
FIG. 10 illustrates base classes correspond to the main classes that objects will be based upon.

As illustrated in FIG. 10, base classes correspond to the main classes that all TechCompany objects will be based upon. All classes spawn from a generic base class (called atom 1002) and each class can be instantiated as an object. The work class 1004 is the base class or template for all work item related objects (e.g. ticket, issue, task, etc.) Each one of these may have their own type specific fields and workflows. A part 1006 is the base class for all part hierarchy related entities used to define a product or service hierarchy (e.g. product, microservice, component). A field 1008 is an attribute tag to add additional detail to an object. A tag may be used to augment an object with a classifier and/or add additional detail to an object when a tag:value pair may be specified. Tags may be global to the organization as a whole, specific to a user, or a subset of users. Tags may be used to augment objects when mapped to an object and a value is set. Here you could have a uniform tag name (e.g. tag.name), which can be mapped to an object with a value set specific to the object (e.g. object1:tag.name:val1, object2:tag.name:val2). Attachments may be used to reference external artifacts to the system and may include URLs, uploads, knowledgebase articles, or any other applicable item relevant in the context of the item it is attached to. All objects in the system may link to others with the construct of a link object 1012. This allows for pre-defined linkage between objects (e.g. defaults), or custom links 1014 that customers wish to add to define relationships between objects. These linkages may also be used to flow information and/or events between objects. For example, an event may be generated from one object and sent to another over a link. An example, of this may be object state changes that may impact the state of a related object.

As noted above, a given object may be associated with its own workflow. The workflow for each object can be based around a status field and includes conditions, actions and event sources. The workflow may correspond to various rules which specify what status fields are allowed and which transitions between status values are allowed. For example allowed status values for a ticket might be open, in-progress, and closed. Allowed transitions could be open to in-progress and in-progress to closed, but open to closed may not be allowed. Further, each transition including self-transition (in which the status value does not change) has conditions and actions. The conditions are logical rules that are used to verify that the change to the object that is allowed. For example, if the user changes the status to closed, then a rule might check that a resolution field is filled in. Actions specify what other changes to this and other objects should be made as part of each change to the object. For example, the system (or user/admin) can define an action to send an email to the assignee of the ticket whenever the status of the ticket changes. Finally, the workflow of an object can be linked to event source such that the transitions on the object may be executed automatically in response to events from external sources. For example, whenever a pull request is created in an application (e.g., GitHub) mentioning an issue, the status of the issue would be automatically changed to in-progress. As another example, when an alert raised in an application (e.g., DataDog). a ticket can be automatically created.

Personalization and customization is a core aspect of the platform allowing the user and/or partners to customize objects to suit their specific needs. The system provides multiple methods of "customization," some being more formalized and controlled, some being targeted to ecosystem partners, and others leveraging more temporary and/or ephemeral techniques. For the structured method a dynamic approach is leveraged where a given type's schema can be can be constructed based upon applicable fragments. Fragments ("schema fragments") are a chunk of a schema that can be strung together to form a full schema. This allows users and ecosystem partners to customize and/or extend an object's schema without impacting all objects of that type. Example uses of this may include an ecosystem partner extending certain objects to include metadata that are specific and/or relevant to their application. For users this may include, organization specific attributes or types. Given that all objects inherit from base classes, this ensures consistency and requirements for certain system defined fields. ENUMs/default selectors can be loosely coupled from the object types and can vary by use case and customer. For example, the default options/fields for a base class ("schema") would be stored as a schema fragment in the object DB (example scenario). Any extensions/customizations to these objects and/or object types would be done through the consolidation of schema fragments. For example, the initial object's schema may be based upon a single fragment. However, after customization and/or extension the object's schema may be constructed based upon one or more schema fragments.

Illustrative Computing System Overview

Figure 13:
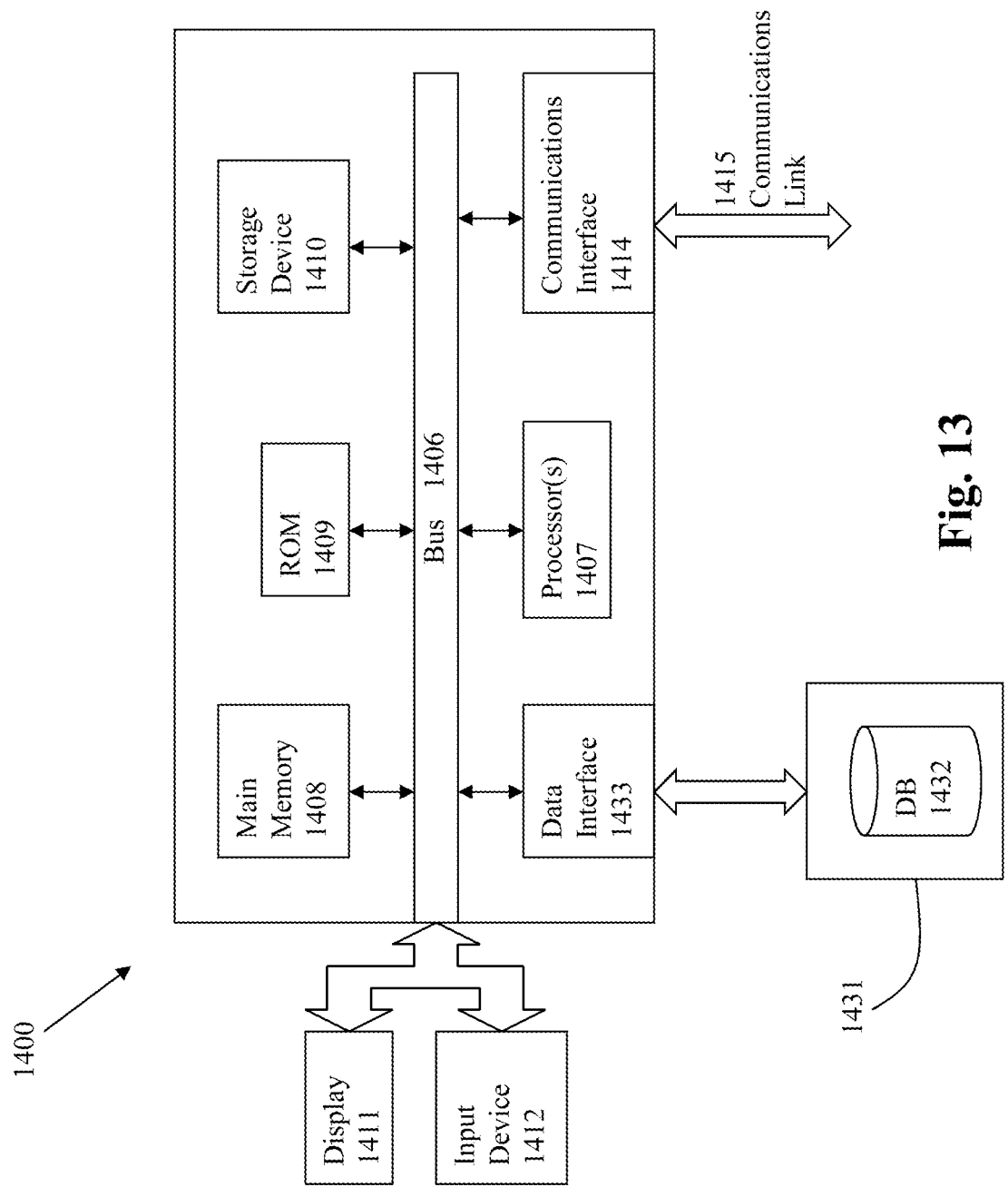
FIG. 13 is a block diagram of an illustrative computing system suitable for implementing an embodiment of the present invention.

FIG. 13 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408. A database 1432 may be accessed in a computer readable medium 1431 using a data interface 1433.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:
1. A method, comprising:
 receiving first data from a development ecosystem, wherein the development ecosystem corresponds to a first system used to develop a technology product;

receiving second data from a non-development ecosystem, wherein the non-development ecosystem corresponds to a second system corresponding to end-use of the technology product;

generating a combined set of data from both the first data from the development ecosystem and the second data from the non-development ecosystem;

performing machine-learning (ML) on the combined set of data from both the development ecosystem and the non-development ecosystem; and funneling results from performing ML-based analysis into multiple levels of funneled data objects;

wherein the machine-learning performed on the combined set of the data from both the development ecosystem and the non-development ecosystem comprises automatic processing of the data to generate a database stored in a tangible machine-readable medium comprising both raw data and categorized data, where correlation is performed against the raw data and the categorized data from both the development ecosystem and the non-development ecosystem.

2. The method of claim 1, wherein the first data from the development ecosystem and the second data from the non-development ecosystem are both provided to a united analysis platform, and an ML processor resides at the united analysis platform to perform the machine learning.

3. The method of claim 1, wherein the first data from the development ecosystem and the second data from the non-development ecosystem correspond to event hierarchies, the event hierarchies comprise stages of funneling for receiving and analyzing the first and second data, where a first event hierarchy corresponds to the first data from the development ecosystem and a second event hierarchy corresponds to the second data from the non-development ecosystem, and the first event hierarchy has different stages compared to the second event hierarchy.

4. The method of claim 1, further comprising:
receiving third data from a user ecosystem, wherein the user ecosystem corresponds to one or more users that use the technology product;
receiving fourth data from a customer relations ecosystem, wherein the customer relations ecosystem corresponds to a customer relations system related to the technology product; and
wherein the combined set of data comprises the first data, the second data, the third data, and the fourth data.

5. The method of claim 1, wherein events from the combined set of data are analyzed to identify an incident, and the incident is analyzed to identify a ticket that is assigned within a software organization to address the ticket.

6. The method of claim 5, wherein the ticket is created based upon clustering of multiple incidents.

7. A computer program product embodied on a computer readable medium, the computer readable medium having stored thereon a sequence of instructions which, when executed by a processor, performs:
receiving first data from a development ecosystem, wherein the development ecosystem corresponds to a first system used to develop a technology product;
receiving second data from a non-development ecosystem, wherein the non-development ecosystem corresponds to a second system corresponding to end-use of the technology product;
generating a combined set of data from both the first data from the development ecosystem and the second data from the non-development ecosystem;
performing machine-learning (ML) on the combined set of data from both the development ecosystem and the non-development ecosystem; and
funneling results from performing ML-based analysis into multiple levels of funneled data objects;
wherein the machine-learning performed on the combined set of the data from both the development ecosystem and the non-development ecosystem comprises automatic processing of the data to generate a database stored in a tangible machine-readable medium comprising both raw data and categorized data, where correlation is performed against the raw data and the categorized data from both the development ecosystem and the non-development ecosystem.

8. The computer program product of claim 7, wherein the first data from the development ecosystem and the second data from the non-development ecosystem are both provided to a united analysis platform, and an ML processor resides at the united analysis platform to perform the machine learning.

9. The computer program product of claim 7, wherein the first data from the development ecosystem and the second data from the non-development ecosystem correspond to event hierarchies, the event hierarchies comprise stages of funneling for receiving and analyzing the first and second data, where a first event hierarchy corresponds to the first data from the development ecosystem and a second event hierarchy corresponds to the second data from the non-development ecosystem, and the first event hierarchy has different stages compared to the second event hierarchy.

10. The computer program product of claim 7, further comprising:
receiving third data from a user ecosystem, wherein the user ecosystem corresponds to one or more users that use the technology product;
receiving fourth data from a customer relations ecosystem, wherein the customer relations ecosystem corresponds to a customer relations system related to the technology product; and
wherein the combined set of data comprises the first data, the second data, the third data, and the fourth data.

11. The computer program product of claim 7, wherein events from the combined set of data are analyzed to identify an incident, and the incident is analyzed to identify a ticket that is assigned within a software organization to address the ticket.

12. The computer program product of claim 11, wherein the ticket is created based upon clustering of multiple incidents.

13. A system, comprising:
a system front end to interface with and receive data collected from both a development ecosystem and a non-development ecosystem;
a stream processor to process the data collected from both the development ecosystem and the non-development ecosystem;
a ML (machine-learning) processor to perform ML operations on the data; and
a set of storage components to store both collected data and analysis data within a unified system;
wherein the machine-learning operations performed on the data from both the development ecosystem and the non-development ecosystem comprises automatic processing of the data to generate a database stored in a tangible machine-readable medium comprising both raw data and categorized data, where correlation is performed against the raw data and the categorized data from both the development ecosystem and the non-development ecosystem.

14. The system of claim 13, wherein the data collected from the development ecosystem and the non-development ecosystem are both provided to a united analysis platform, and the ML processor resides at the united analysis platform.

15. The system of claim 13, wherein the ML operations performed on the data from both the development ecosystem and the non-development ecosystem comprises automatic processing of the data to generate a database comprising both raw data and categorized data, where correlation is performed against the raw data and the categorized data from both the development ecosystem and the non-development ecosystem.

16. The system of claim 13, wherein the data from the development ecosystem and the non-development ecosystem correspond to event hierarchies, the event hierarchies comprise stages of funneling for receiving and analyzing the data, where a first event hierarchy corresponds to first data from the development ecosystem and a second event hierarchy corresponds to second event data from the non-development ecosystem, and the first event hierarchy has different stages compared to the second event hierarchy.

17. The system of claim 13, wherein the system front end further receives the data from a user ecosystem and a customer relations ecosystem.

18. The system of claim 13, wherein events from the data are analyzed to identify an incident, and the incident is analyzed to identify a ticket that is assigned within a software organization to address the ticket, wherein the ticket is created based upon clustering of multiple incidents.

\* \* \* \* \*